(12) United States Patent
Barkan

(10) Patent No.: US 12,164,666 B2
(45) Date of Patent: Dec. 10, 2024

(54) HANDS FREE ACCESS MANAGEMENT AND CREDENTIAL PROTECTION

(71) Applicant: Mordecai Barkan, Palo Alto, CA (US)

(72) Inventor: Mordecai Barkan, Palo Alto, CA (US)

( * ) Notice: Subject to any disclaimer, the term of this patent is extended or adjusted under 35 U.S.C. 154(b) by 136 days.

(21) Appl. No.: 17/562,974

(22) Filed: Dec. 27, 2021

(65) Prior Publication Data

US 2023/0205914 A1    Jun. 29, 2023

(51) Int. Cl.
| | |
|---|---|
| *G06F 21/00* | (2013.01) |
| *G06F 21/62* | (2013.01) |
| *H04L 9/40* | (2022.01) |
| *H04W 12/122* | (2021.01) |

(52) U.S. Cl.
CPC ........ *G06F 21/6245* (2013.01); *H04L 63/145* (2013.01); *H04W 12/122* (2021.01)

(58) Field of Classification Search
None
See application file for complete search history.

(56) References Cited

U.S. PATENT DOCUMENTS

| | | | | |
|---|---|---|---|---|
| 7,065,790 B1 * | 6/2006 | Gryaznov | ............ | G06F 21/562 713/188 |
| 8,010,801 B2 * | 8/2011 | Qi | ...................... | H04L 63/0485 713/153 |
| 8,245,294 B1 * | 8/2012 | Zahra | ...................... | G06F 21/56 726/25 |
| 8,316,237 B1 * | 11/2012 | Felsher | ................. | H04L 63/061 380/282 |
| 8,769,268 B2 * | 7/2014 | Morozov | ................ | G06F 21/74 718/107 |
| 9,015,842 B2 * | 4/2015 | Troyansky | ............ | G06F 21/577 709/224 |
| 9,830,452 B2 * | 11/2017 | Jiang | ....................... | G06F 21/56 |
| 11,184,322 B2 * | 11/2021 | Dawes | .................... | H04W 4/38 |
| 2009/0150968 A1 * | 6/2009 | Ozzie | ...................... | H04L 63/08 707/999.102 |
| 2010/0332593 A1 * | 12/2010 | Barash | .................. | H04L 63/145 709/203 |
| 2011/0296164 A1 * | 12/2011 | Boebert | ................ | G06F 21/604 709/225 |
| 2013/0111211 A1 * | 5/2013 | Winslow | ............... | H04L 9/3234 713/150 |
| 2014/0359274 A1 * | 12/2014 | Kirkup | .................. | H04L 9/0844 713/150 |
| 2015/0213275 A1 * | 7/2015 | Reese | ..................... | G06F 21/84 726/26 |

\* cited by examiner

Primary Examiner — Maung T Lwin

(57) ABSTRACT

A trusted component is suggested to be added to off the shelf computing systems such as PCs or smartphone providing secure functions for access management and credential protection—safe authentication, maintaining session integrity and validation of content modification. An additional advantage of the solution that it detects malware/hacking attempts on first try allowing of taking action while oblivious to the malware/hacker to avoid retaliation. The trusted component may be any type of computing system that could be regarded trusted.

12 Claims, 17 Drawing Sheets

HANDS FREE ACCESS MANAGEMENT AND CREDENTIAL PROTECTION

CROSS REFERENCE TO RELATED APPLICATIONS

This application is a continuation-in-parts of U.S. patent application Ser. No. 16/530,108, filed on Aug. 2, 2019 and titled "Hands free access management and credential protection", which is a continuation-in-part of U.S. patent application Ser. No. 15/499,848, filed on Apr. 29, 2017 and titled "Access Management and Credential Protection", which is a continuation-in-part of U.S. patent application Ser. No. 14/606,992, filed on Jan. 27, 2015 and titled "Secure Computer Architectures, Systems, and Applications," which is a continuation-in-part of U.S. patent application Ser. No. 14/040,352, filed on Sep. 27, 2013 and titled "Secure Computer Architectures, Systems, and Applications," which claims the priority benefit of U.S. Provisional Application Ser. No. 61/744,677, filed on Oct. 2, 2012 and titled "Computer Architecture, System and Applications," and this application claims the benefit and priority of U.S. Provisional Patent Application Ser. No. 61/965,313 filed on Jan. 28, 2014 and titled "Add-on To Existing Computing Systems to Enhance Their Security," all of which are hereby incorporated by reference herein in their entireties, including all references cited therein.

FIELD OF THE TECHNOLOGY

Embodiments of the disclosure relate to computer security. More specifically, but not by way of limitation, the present technology provides secure computing architectures, systems, and applications. In some embodiments, the present technology employs both trusted and legacy hardware environments that protect sensitive user information and increase data security, privacy, and safety.

SUMMARY OF THE DISCLOSURE

According to some embodiments, the present technology is directed to a system, comprising: (a) a legacy environment comprising an off-the-shelf computing system; (b) a hardware computing device, serves as trusted environment, that communicates with a network and the legacy environment; and (c) the user communicating wirelessly with the hardware computing device which comprises security functions such as authentication.

The invention allow for the protection—security, safety, and privacy—of a user of a malware infected legacy computing system from divulging sensitive information that risks the user and may cause him damage.

According to other embodiments, the present technology is directed to a system, comprising: (a) a mobile computing device; and (b) a trusted environment device that can communicatively couple with the mobile computing device, the trusted environment device being configured to communicate with a network directly to prevent the mobile computing device from accessing user sensitive information thus the trusted environment device preventing the mobile computing device from executing a malicious attack.

A secured site supports the secured communication by user of the combined mobile and trusted devices to the secure site or serviced sites via the secured site.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that can be readily apparent to those of ordinary skill in the art having the benefit of the description herein.

In the following the subject of this innovation, an hardware computing device could be referred to as trusted device, trusted environment, trusted component or integrated trusted computing device.

Legacy system may be also referred to as legacy environment or legacy computing system.

Figure 1:
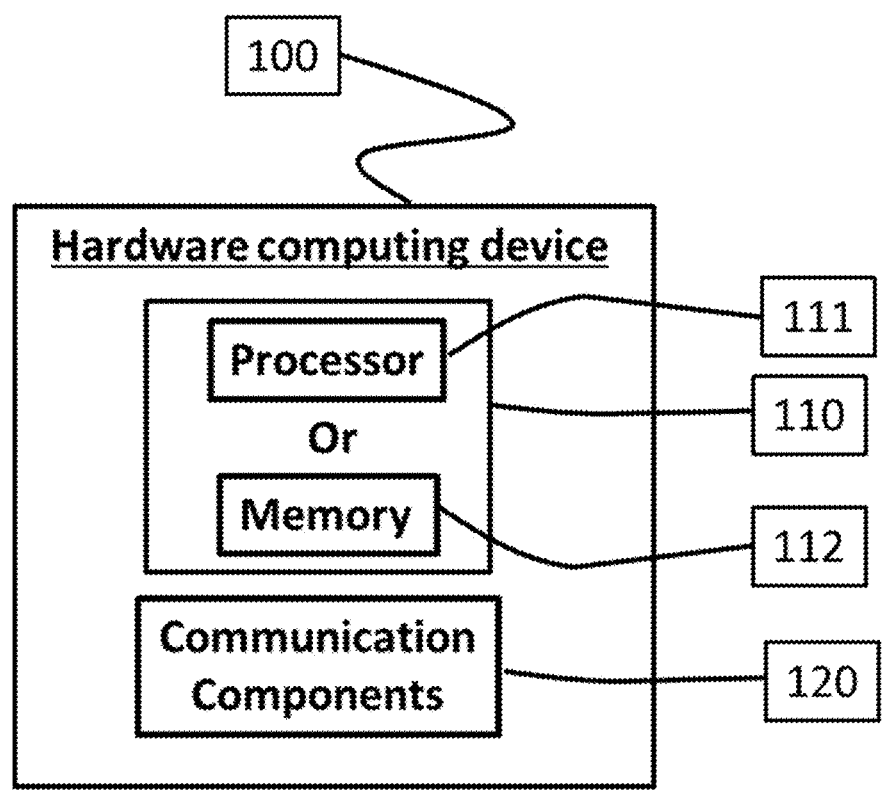
Figure 2:
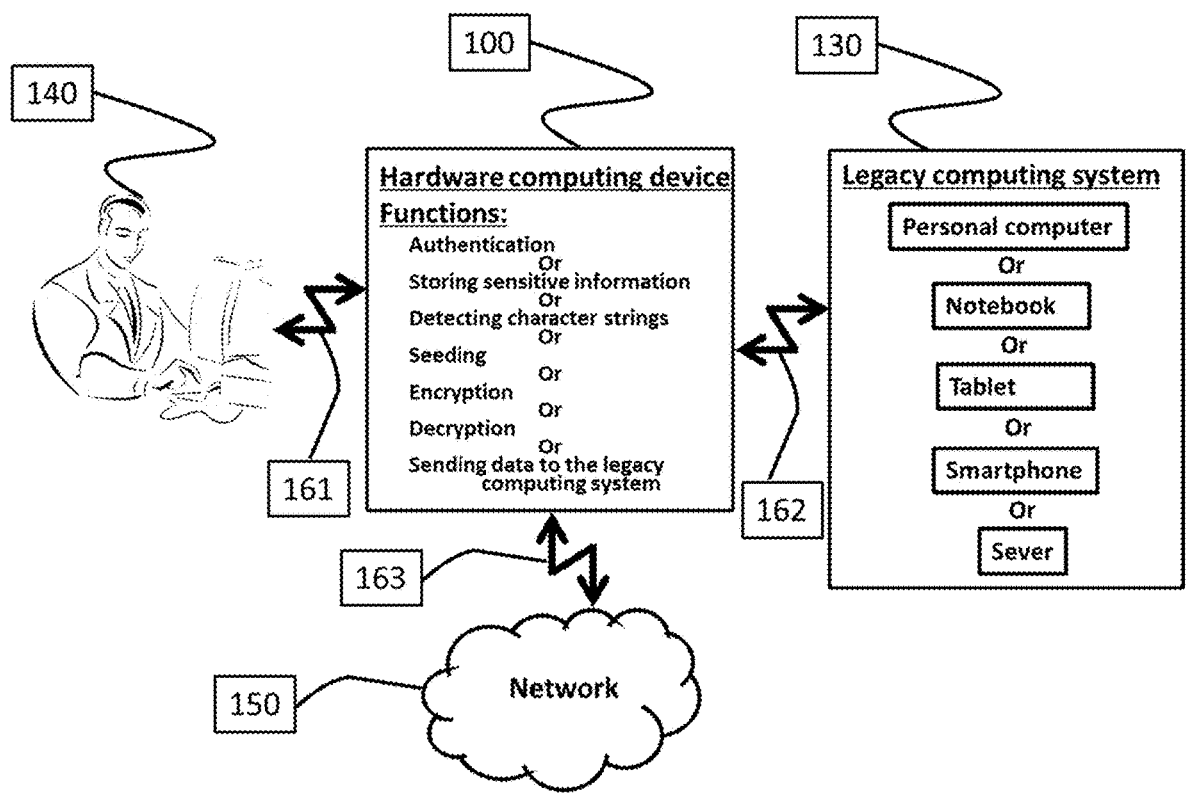
Figure 3:
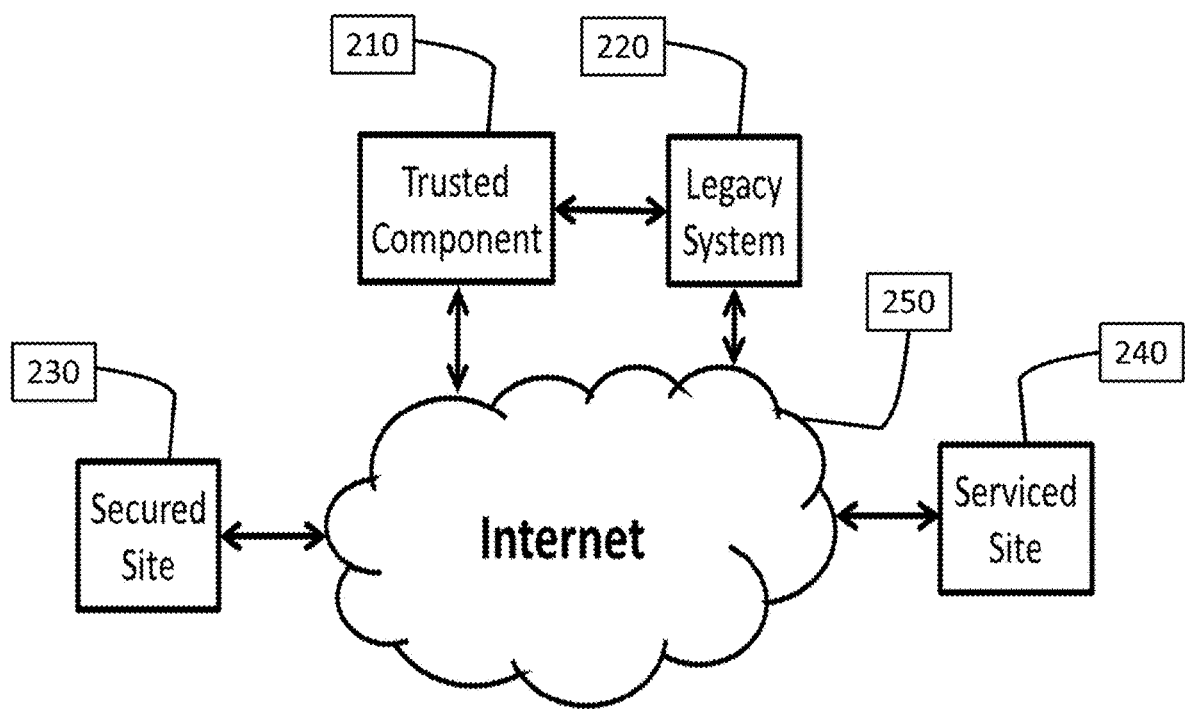
Figure 4:
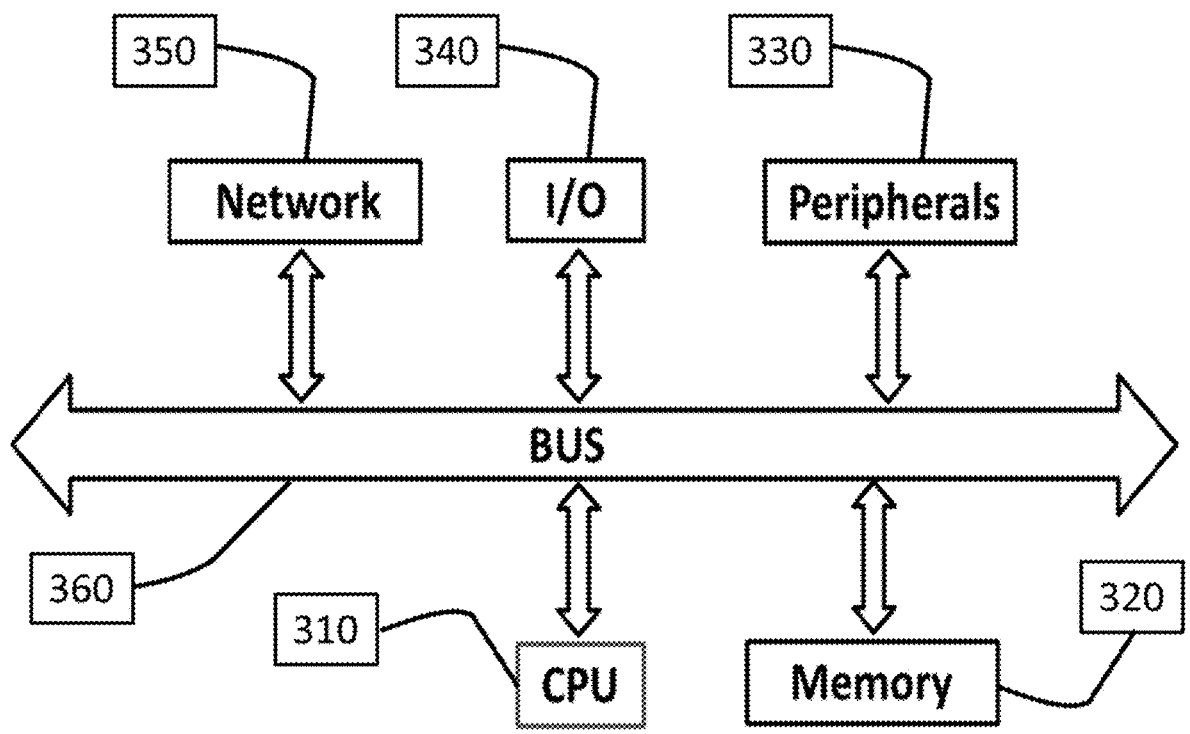
Figure 5:
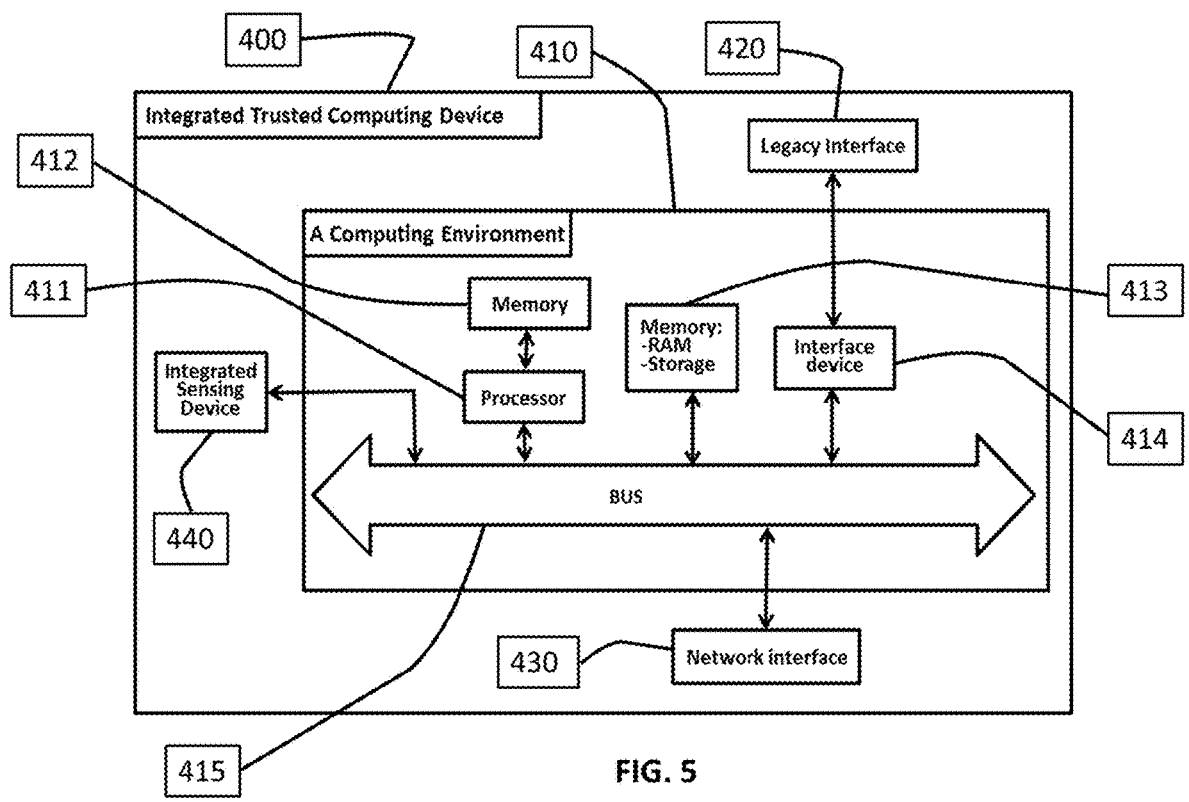
Figure 6:
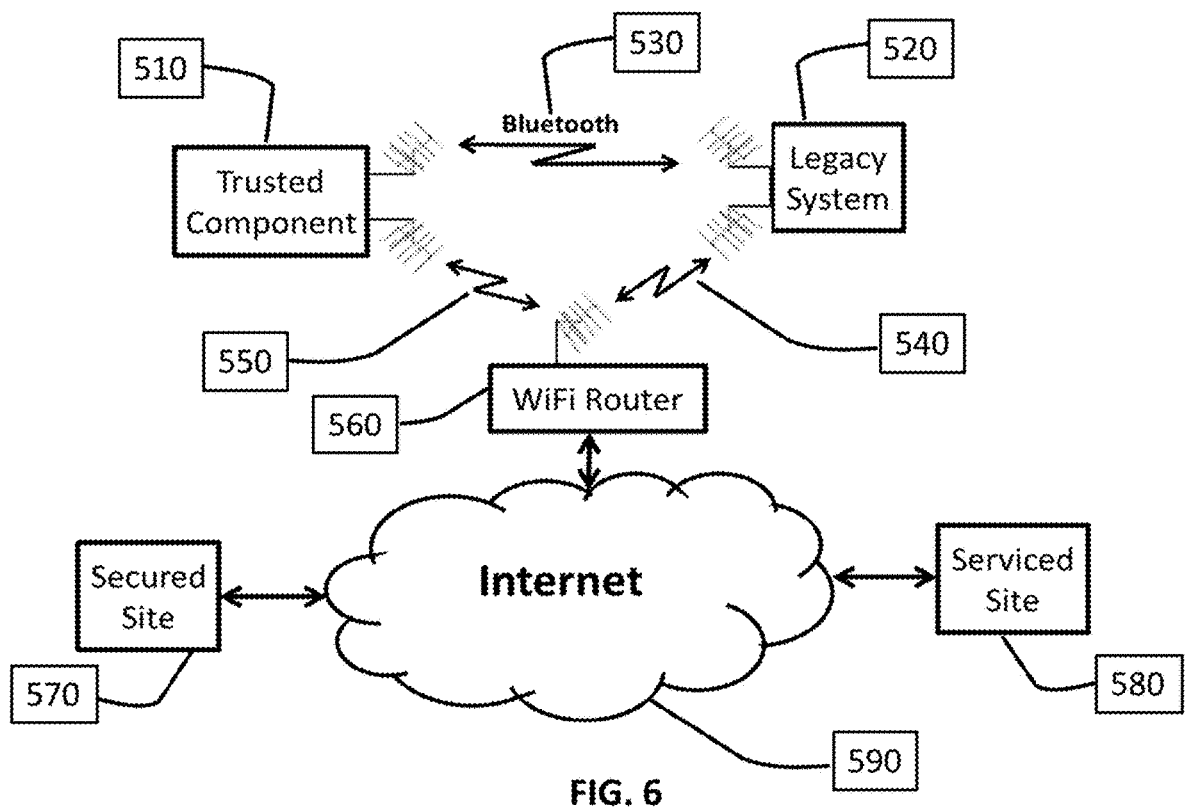
Figure 7:
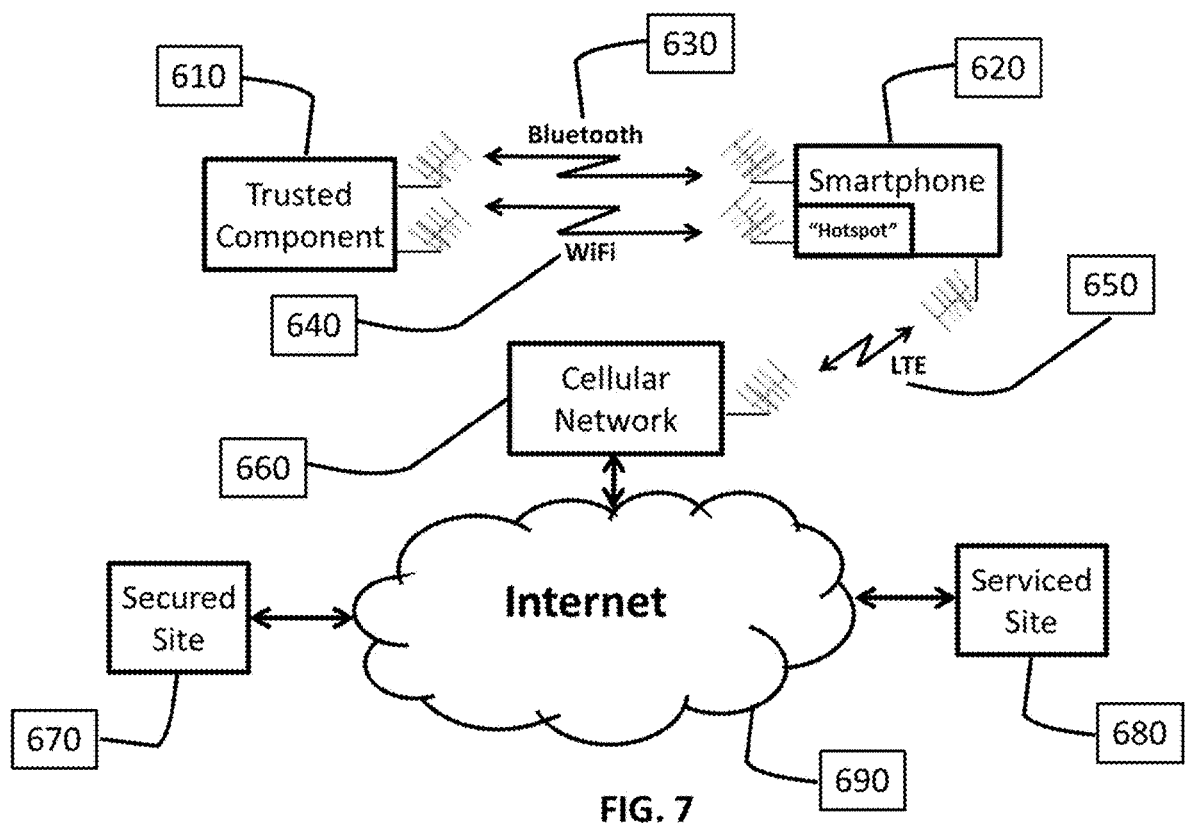
Figure 8:
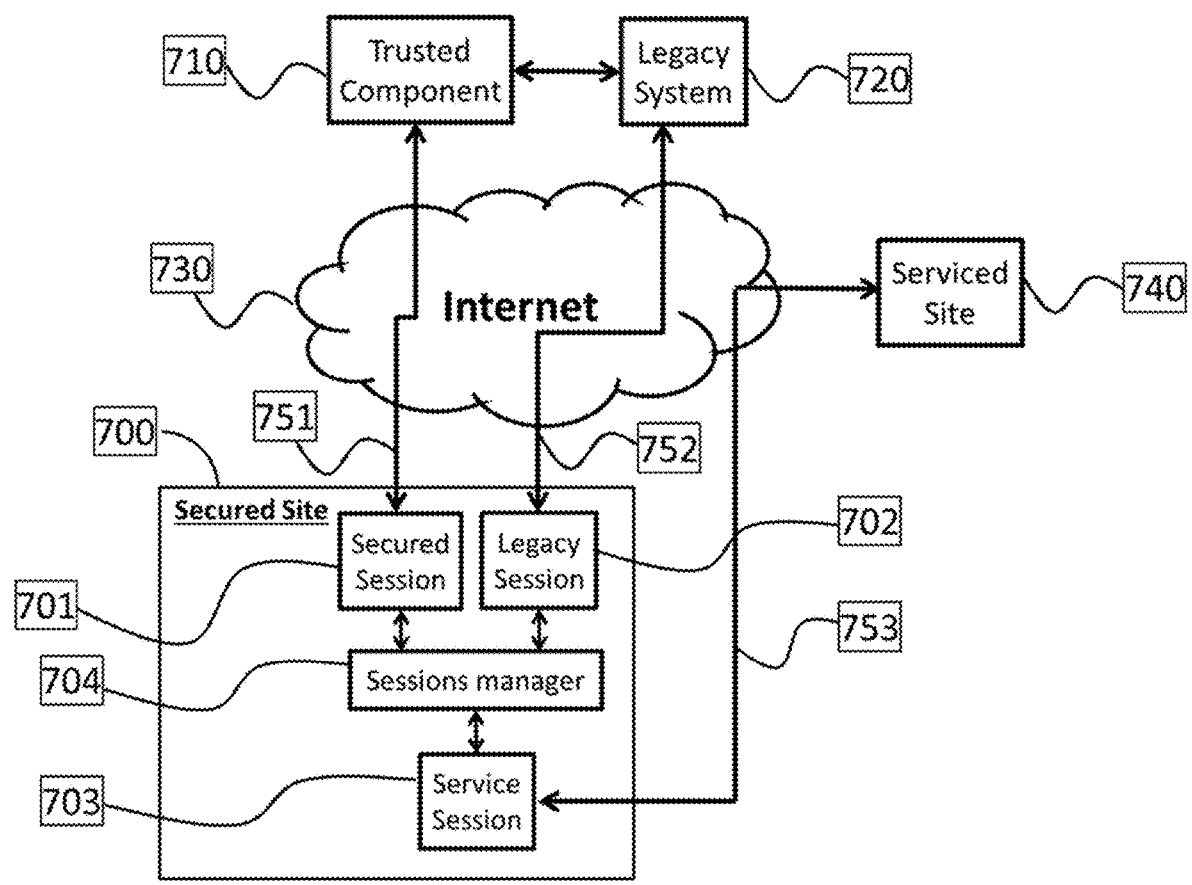
Figure 9:
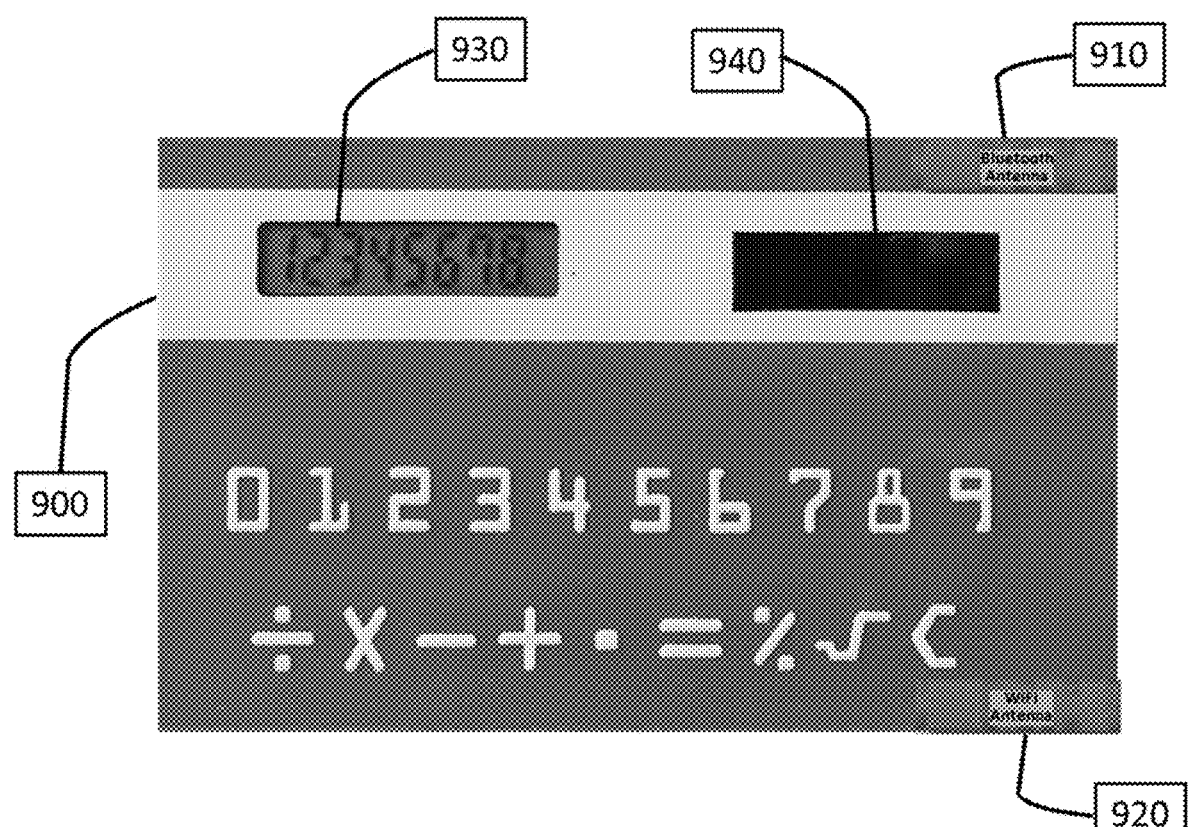

FIG. 1 is an exemplary hardware computing device which serves as an add on wireless trusted environment;

FIG. 2 depicts the integration of the hardware computing device with the internet to secure an off the shelf legacy computing system communication with internet sites;

FIG. 3 depicts the key components of the suggested implementation of a secured system;

FIG. 4 depicts a structure of a typical legacy computing architecture that is implemented in computing systems such as the hardware computing device and the legacy computing system;

FIG. 5 depicts the hardware computing device here named integrated trusted computing device;

FIG. 6 depicts the wireless version of the network of FIG. 3—key components of the suggested wireless secured system. The hardware computing device here is named a trusted component;

FIG. 7 depicts the network of FIG. 6 taking advantage of phone hotspot;

FIG. 8 secured site integration in a secure implementation;

FIG. 9 depicts an exemplary implementation as credit card format; and

Figure 10:
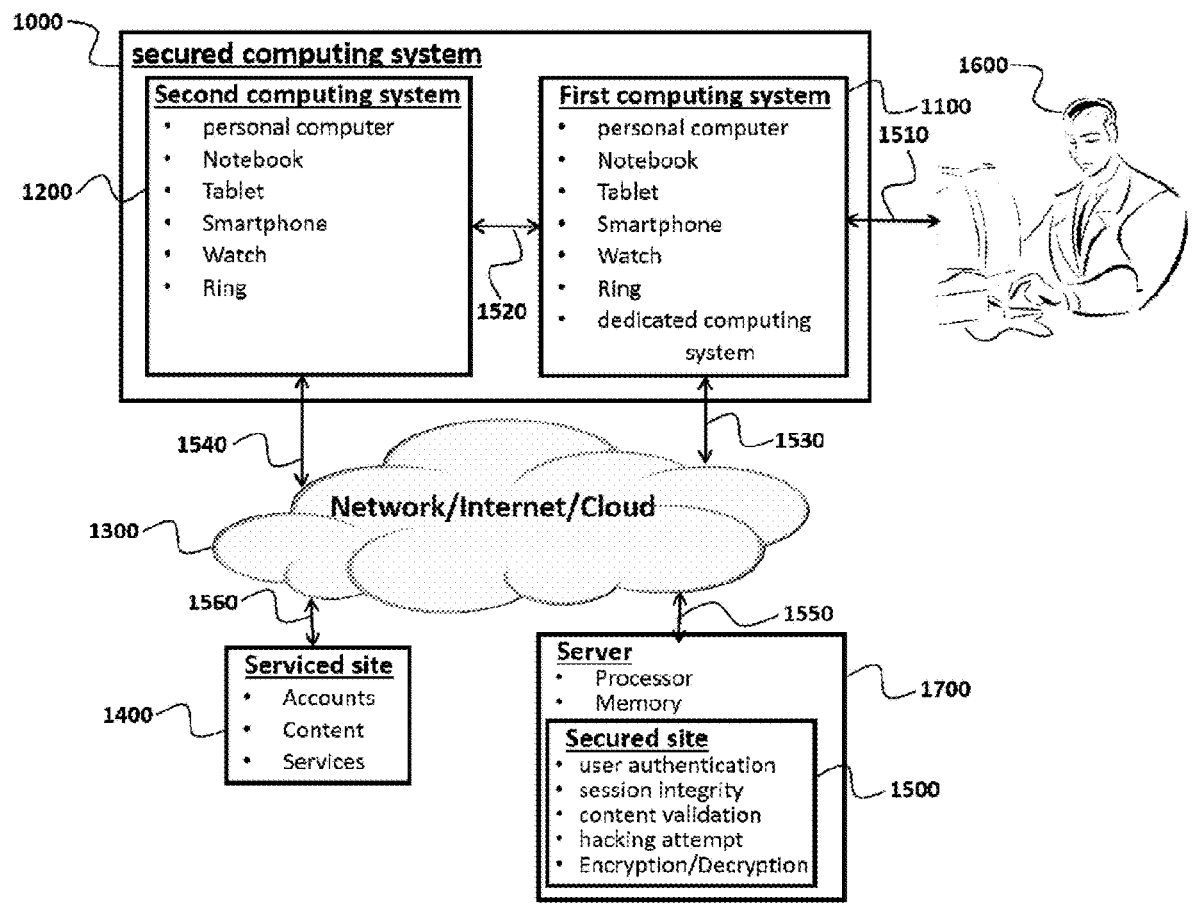

FIG. 10 depicts an exemplary description of a configuration that utilizes two off-the-shelf computing system to allow secured communication of a user with network sites.

Figure 11:
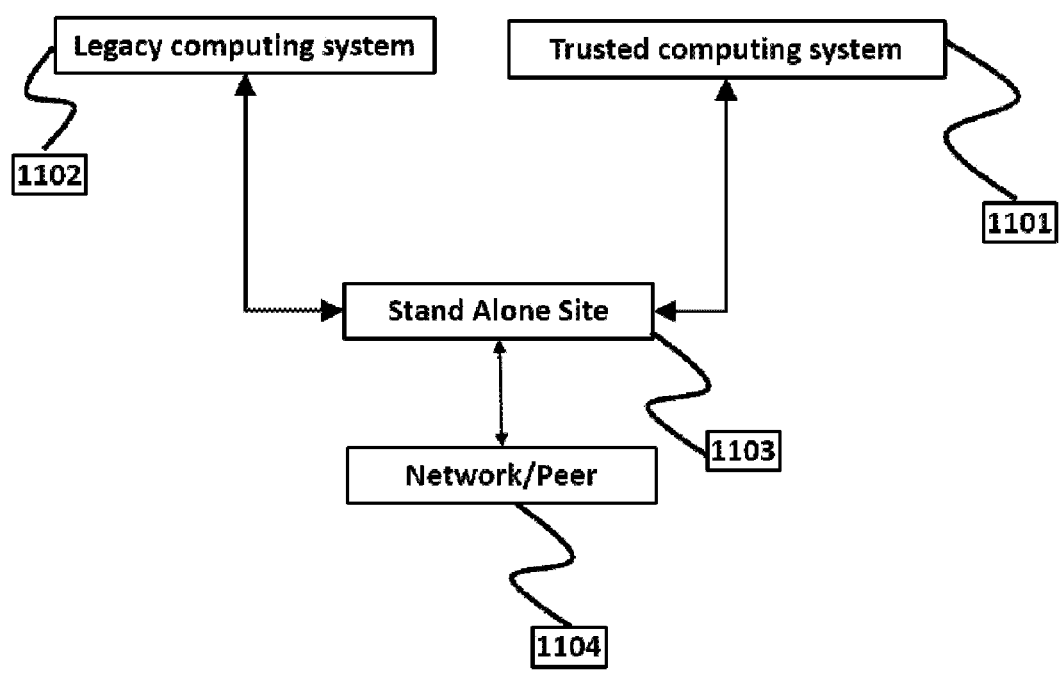

FIG. 11 depicts the basic structure of a Stand Alone Site (SAS) network/system

Figure 12:
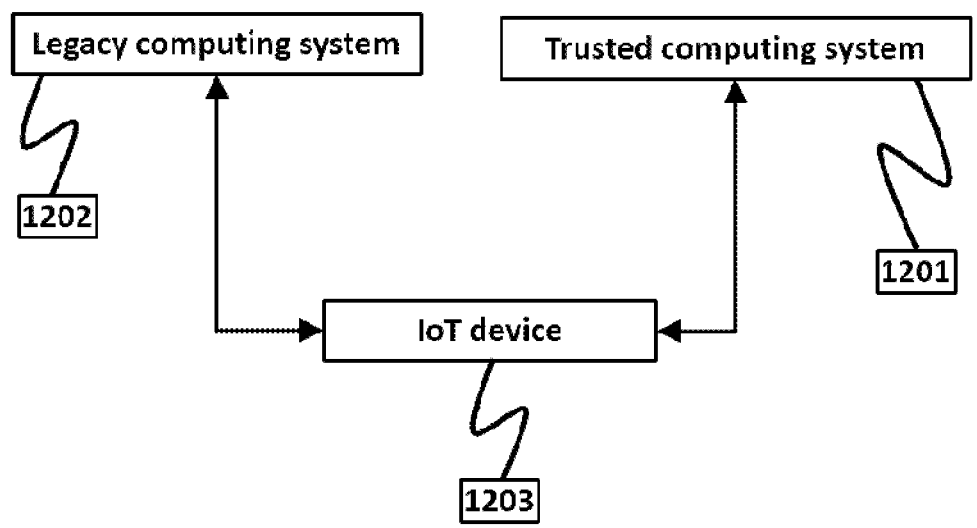

FIG. 12 depicts a structure with direct communication to an IoT (Internet of Things) device making the SAS.

Figure 13:
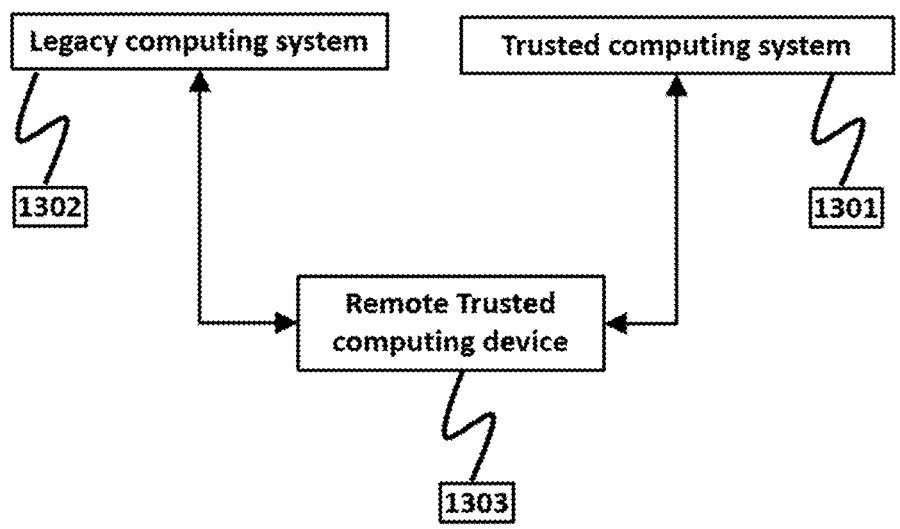

FIG. 13 depicts a SAS that serves as proxy to other SAS

Figure 14:
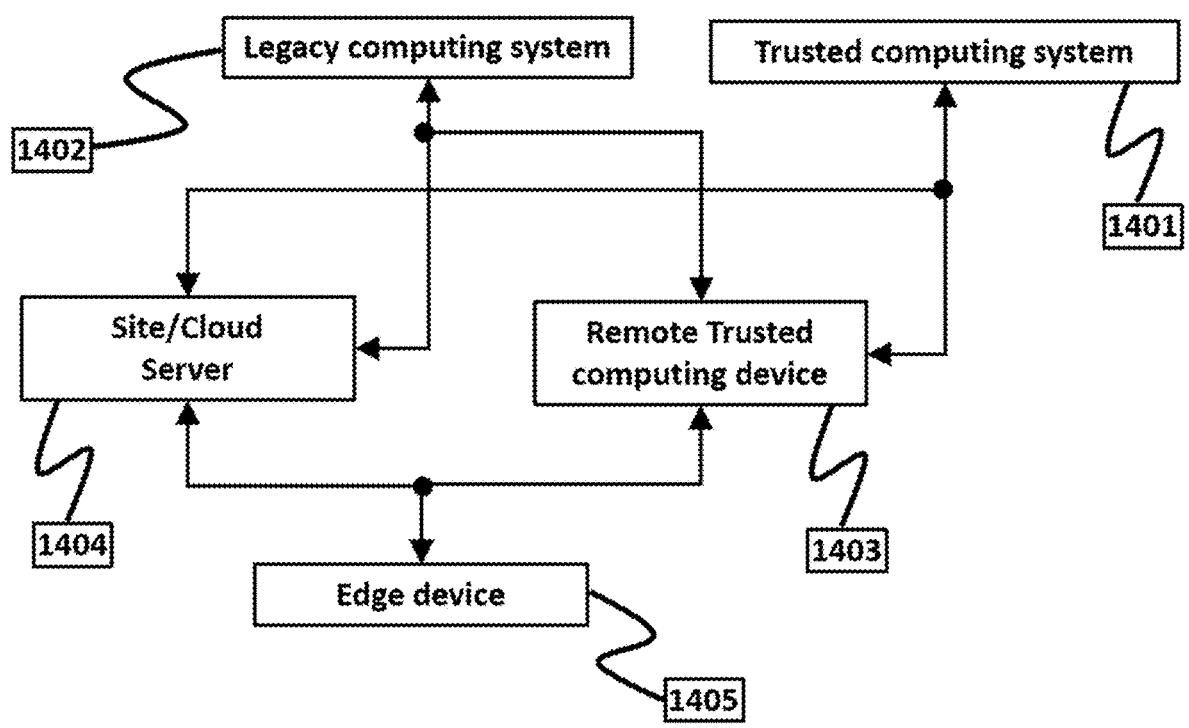
Figure 15:
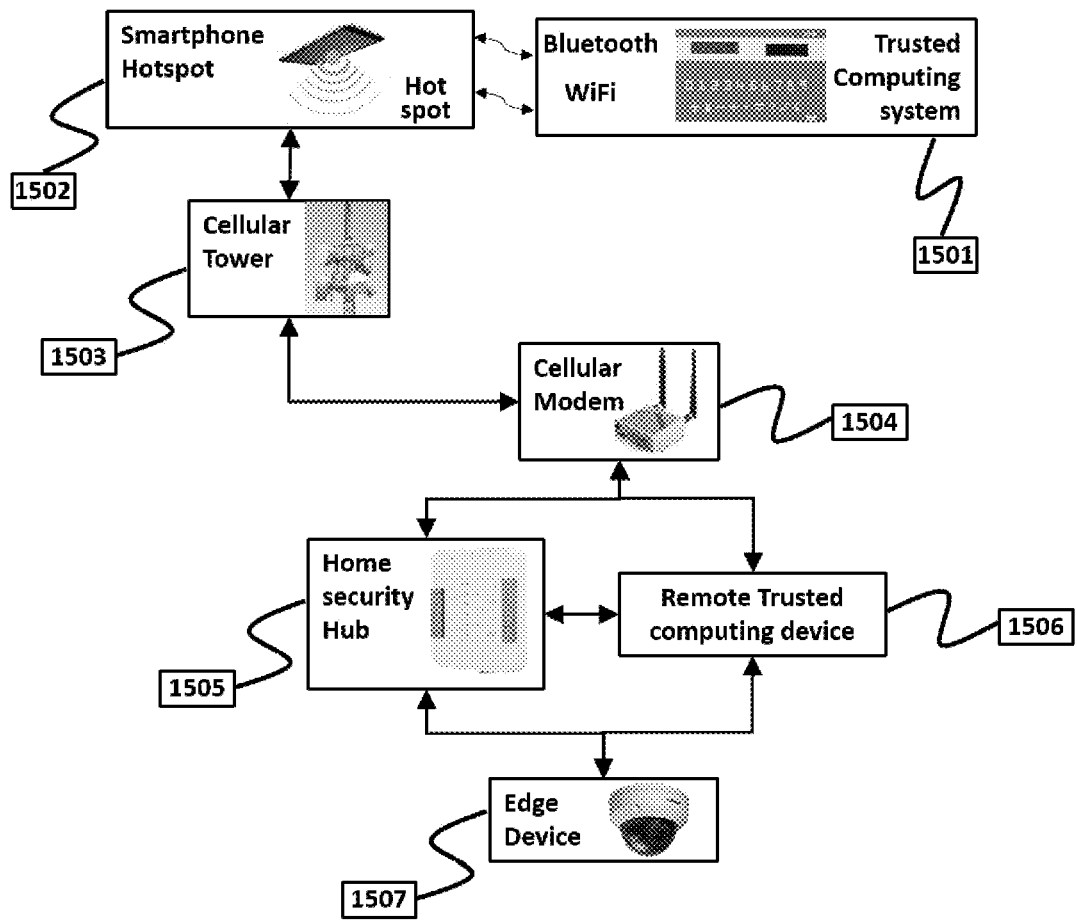
Figure 16:
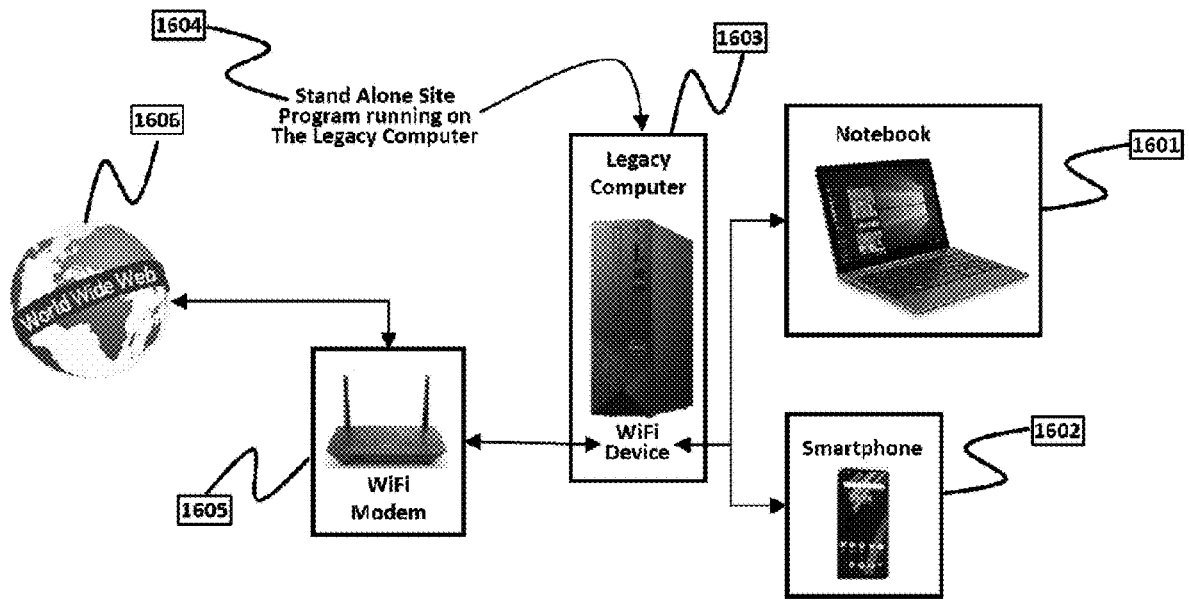

FIG. 14 depicts communication to an edge device (Could be an IoT) by means of the proxy FIG. 15 depicts a complete system for securing home automation FIG. 16 depicts a home system with a Stand Alone Site program incorporated in a standalone legacy computer.

Figure 17:
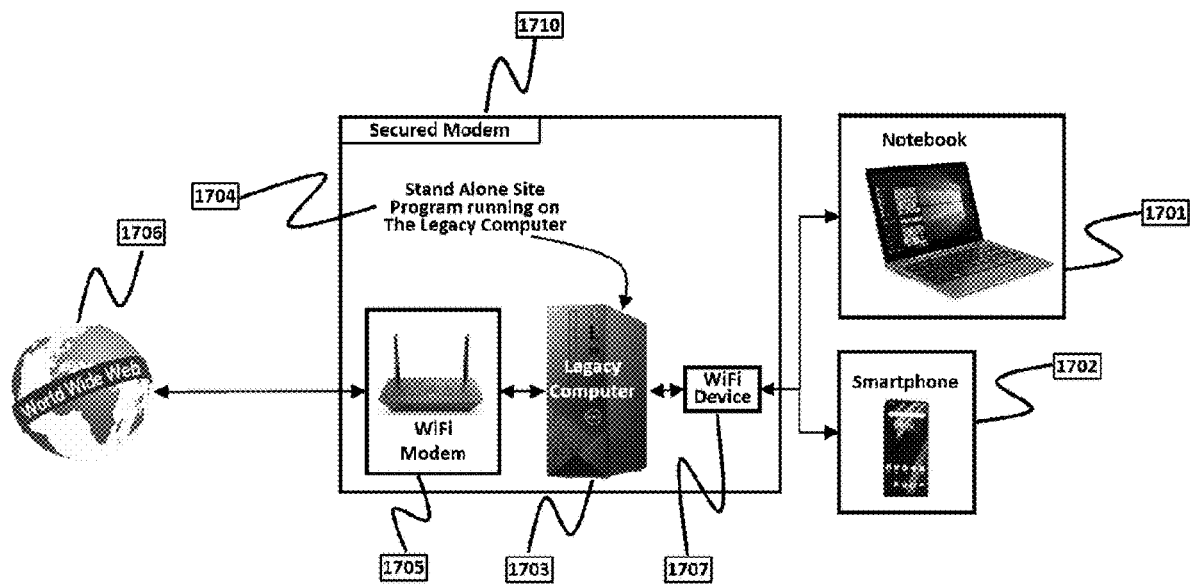

FIG. 17 depicts the home system where the home WiFi modem incorporate the Stand Alone Site (SAS)

DETAILED DESCRIPTION

FIG. 1 depicts a device comprising a hardware computing device, including any of a processor, a memory or combination thereof and wireless communication component;

The basic two forms for the hardware computing device 100 that serves as trusted environment, may also termed trusted component. It could be a full featured computing system as described in FIG. 4. The diagram describes key elements 110 of the device which include a Processor 111, if the device supports a fully featured computing system or memory 112 based device to secure storage of sensitive information. The device includes the support components to allow the required operation and any person skilled in the art knows how to implement such systems—the challenge are requirements and functions implemented by the device as detailed for some preferred embodiments here after.

The hardware computing device includes communication components 120 interfacing an off the shelf legacy computing system 130 as described in FIG. 2 and allow input and output of data by a user 140 as described in FIG. 2. The key characteristic of the communication components is to support wireless communication as further discussed in the detailed description of FIG. 2. Though the key purpose of communication components 120 is wireless in some embodiments wired communication may be supported to either the legacy computing system 120 or the user 140.

FIG. 2 depicts the hardware computing device 100 communicating 162 wirelessly with a legacy computing system 130, the legacy computing system 130 including any of a personal computer, a notebook, a tablet, a smartphone, a server, a watch, a ring or combination thereof;
- the hardware computing device 100 communicating 163 wirelessly with a network;
- any of an input data, output data or combination thereof communicating 161 wirelessly with the hardware computing device 100, where the communication 161 not accessible by the legacy computing system 130;
- the hardware computing device 100 capable of supporting security functions including any of authentication, storing sensitive information, detecting character strings, seeding, encryption, decryption, sending data to the legacy computing system 130, or combination thereof.

FIG. 2 depicts the integration of the hardware computing device 100 in a preferred practical implementation.

The hardware computing device 100 communicates the legacy computing system 130 via a wireless 162 link. This 162 link could be Wi-Fi, Bluetooth, ZigBee or any other type—ultrasound, IR or other. The legacy computing system 130 may be any of computing system—Personal computer, notebook, tablet, smartphone, server, work station . . . .

A user 140 communicates with the hardware computing device 100 by means of the 161 wireless link. The user 140 may input data or receive data from the hardware computing device 100. The wireless input may be achieved by any of voice or audio (a microphone installed in the hardware computing device 100), gesture or lip read (a camera installed in the hardware computing device 100) . . . . Those are just examples of such communication and a person skilled in the art could find other means for wireless input. Such communication does not negate direct input means—such as switches, touchpad, keyboard . . . .

The user 140 further may communicate with the legacy computing system 130 or the network 140 via the hardware computing device 100 supporting secure operation as described later.

The user 140 may get receive information from the hardware computing device 100 by means of audio (a speaker installed in the hardware computing device 100) or images/text (a display installed in the hardware computing device 100).

The integrated hardware device 100 is connected to the network 150 (such as Internet) by means of a wireless link 163 that may be implemented by means of Wi-Fi. This will allow the user 140 to communicate directly, without the legacy computing system 130 accesses to the communication, to secured site 230 that is presented in FIG. 3

Various security and processing functions may be supported, but not limited to, by the hardware computing device 100:

1. Authentication—by means of voice recognition, password voiced by the user as a word or character at a time, by means of the switches, by the lip reading, gesture, finger print or any other that are available and may be implemented by persons skilled in the art.
2. Storing sensitive information—this information may be input by the user 140 or from the secured site 230 in FIG. 3. Sensitive data may be but not limited to: passwords, user biometric signatures (voice, face, finger print . . . ), credit cards number, bitcoin and other crypto currency information, encryption and decryption codes, URLs. Sensitive data may be programs such as but not limited to—encryption/decryption, characters strings detector and seeding (such as but not limited to—passwords, account numbers, URLs, credit cards numbers . . . ), or programs to be download to the be down loaded to the legacy computing system 130 such as but not limited to—boot up, BIOS, peripherals drivers (keyboard, camera . . . ), favorite lists . . . .
3. Detecting character strings—this specific program will detect input that is sensitive and should not be transferred to the legacy computing system 130. Data (character strings) may be processed by the hardware computing device 100 or transferred as is to a secured site 230 as described in FIG. 3
4. Seeding—this function allow replacement of character strings with strings that will support detection of attempts by malware infecting the legacy computing system 130 to use directly or by communicating with a remote operator (hacker) sensitive information to impact the safety or privacy of the user and cause monetary or other damage to the user 140.
5. Encryption and decryption—the use of hardware computing device 100 for these function will avoid exposure of encrypted files to the legacy computing system 130 will reduce the risk of divulging sensitive information where the codes and keys are maintained and kept in the hardware computing device 100
6. Sending data to the legacy computing system 130 supports the communication of the user 140 with the legacy computing system 130 via the hardware computing device 100

FIG. 3 depicts a general block diagram, the hardware computing device 210, named here trusted component, integrated with the internet 250 network and the trusted component 210 communicates with a legacy computing system 220, named here just legacy system. The legacy system 220 is integrated with the internet 250 network. A secured site 230 supports secured communication of the trusted component 210 to internet 250 sites, such as the serviced site 240.

Peripheral input devices (such as but not limited to—keyboard, camera, microphone, mouse, touchpad . . . ) or output devices (such as but not limited to—display, speaker, LEDs . . . ) may be connected to trusted component 210 or legacy system 220.

Such input and output devices allow the user to communicate with the secured 230 and serviced 240 sites.

The legacy system 240 allow for the user to communicate with all internet 250 (or any other network to which it may be connected) by the legacy means and even directly to the serviced site 240.

For purpose of clarification, FIG. 4 depicts the basic structure of a computing system, such as the hardware computing device 100/210 or a legacy computing system 130/220.

FIG. 4 outlines the basic structure of a typical computing device which is utilized to implemented the computing device 100 that serves as the trusted environment, the legacy computing system 130, the computing systems on which the secured 230 and serviced 240 sites run or executed Two components are part of any computing system, CPU 310 and Memory 320

Other components, but not limited to these list, are peripherals 330, I/O 340 and Network 350

In a typical implementation all the computing device components are connected by a BUS 360 that supports transfer of data and addresses between the various components CPU 310 process data by means of programs stored in the memory 320. The data acquired from the different components of the computing system—memory 320, peripherals 330, I/O 340 and the network 350. Data or processed data may be communicated to the various components mentioned above. The CPU could be structured with various numbers of core processors and for anyone skilled in the art no further elaboration is needed.

Memory 320 stores programs and data and may be implemented by use of various types of memory, such as but not limited to—RAM (Random Access Memory), ROM (Read Only Memory), Dual Ported, and other . . . .

Peripherals 330 are representatives, but not limited to, elements that support various needs of processing or storing of data, such as security functions (such as TPM), memory access, accelerators and others I/O 340 are representatives of software drivers that support such elements that serve as input devices such as, but not limited to: microphone(s), camera(s), biometric authentication (finger print, iris, face . . . ) . . . and supporting communication such as, but not limited to, USB, Bluetooth or other types of interface.

The network 350 is the software element that allow the computing system to communicate with other computing systems or simplified computing systems that include minimal elements: memory only and drivers for communication or a sensor and digital interface to the network.

It is important to emphasize that any person skilled in the art could construct computing system that are minimal implementations such as CPU 310 only or memory 320 only FIG. 5 depicts an integrated trusted computing device 400 which may be referred to as trusted environment or trusted device or trusted component or integrated computing device—an integrated trusted computing device.

A full computing system may be implemented as a integrated trusted computing device 400 as depicted in FIG. 5. Specific designs may use partial implementations. A minimal case could be the use of memory only with simple gate array and some firmware. Such implementations may be used to save money when cost consideration lead to minimal designs by limiting functionality.

Simplest Form:

The device could include just memory to store sensitive information such as password and means to communicate with the legacy and the network. The storage of the sensitive information may be made by communication from the legacy or from the network. The information of the network connection, Wi-Fi and a specific service site—the secured site—may be preinstalled even during the manufacturing and sales process of the device. A simple programing mechanism may allow the setup and storing of password. Device ID may be installed. The operation of the device could be for just communicating the sensitive data directly to the secured site: Device ID and password—allowing out of band authentication.

Featured Form:

On the other end of the "hands free" spectrum an integrated trusted computing device may be a single component, encompassed as a hardware device that could be connected to a legacy system by means of an hardware connection, such as USB, or a wireless connection, such as Bluetooth. The device implements a complete computing device as depicts in FIG. 4. The device could operate as a standalone, hands-free apparatus to support access management and credential protection.

Conceivable components of an integrated trusted computing device 400 (termed also as: hardware computing device 100) may be, but not limited to:

A computing environment 410 which include various elements such as described here after but not limited to those:

A processor 411 connected to memory 412 which stores the program to be run by the processor.

Additional memory 413 that could include RAM and may serve as temporary storage for processing support.

Interface device 414 that supports the connection to the legacy system via the legacy interface 420.

A BUS 415 that allow communication of the above elements with control of the processor 411 that runs programs and processes.

Legacy interface 420 supports communication of the integrated trusted computing device 400 with a legacy system.

Network interface 430 supports the communication of the integrated trusted computing device 400 with the network and its various nodes.

Integrated sensing device 440 supports connecting I/O devices to the integrated trusted computing device 400, such as but not limited to—keyboard, mic, camera, speakers, display, biometric The integrated trusted computing device 400, may be used as hands off add on hardware device to legacy systems to support security functions: protect user sensitive data, memory, data communication and such.

The trusted environment is encompassed in the trusted component of the diagram—for hands free operation it might have integrated a microphone, allowing a voice activation operation—thus hands-free.

The trusted component device may be powered by, but not limited to, the legacy system (if connected by a USB means to the legacy system) or may be powered by a battery.

The integrated trusted computing device 400 may be connected to the network via a wireless connection, such as Wi-Fi. If desired, for security reasons, the integrated trusted computing device 400 may be connected to the network by a LAN hardwired connection.

The integrated trusted computing device 400 may have connection to peripheral devices such as keyboard, allowing for secured setting up—storing sensitive information in memory such as, but not limited to: passwords, credit cards, encryption keys, account numbers, SS number, other IDs.

The connection of integrated trusted computing device 400 may be by wireless means, and the need for a keyboard may be removed and a full hands free operation is possible as explained in the following.

Hands Free Operation

The following is a description of one of the preferred embodiments. A person skilled in the arts could find many derivatives and uses that are not going to be detailed here but obvious given the description hereafter. The description does not limit the uses and the potential implementation in any way, on the contrary it provides insight in the potential of the innovation to be applied in various ways to solve and meet a variety of requirements and needs with support of a feature rich implementation where the integrated trusted computing device 400 is connected to different types of peripherals even simultaneously, and secures the user from network attacks that result infection with malware, of the legacy system to which the integrated trusted computing device 400 is connected.

By utilizing a microphone and voice recognition algorithm programed to the integrated trusted computing device 400 a user could be authenticated. The vulnerability of a legacy system of hacker taking control of the legacy and incorporate hacker assisted voice recognition—a task that is complex from the hacker point of view and will be hard for the hacker to implement will be exposed. Password still provided by the voice to text converter in the integrated trusted computing device 400 (the user "tells" the password to the device) will further conceal and protect the operation of the device from malware. The integrated trusted computing device 400 will have conversion to text function (as mentioned in the previous paragraph). Another function supported by the integrated trusted computing device 400 will be voice compression and encryption—allowing for secured voice communication with other users of computing systems. The secure communication could be achieved between two systems that have the integrated trusted computing device 400.

The authentication is a multifactor authentication—voice recognition that identifies the user and password the user say and is captured by the integrated trusted computing device 400 microphone and interprets by the voice to text converter with the additional factors—the device ID number and a session ID that is different for every session.

Other credentials may be used for authentication such as biometric—finger print, iris, facial recognition with capturing components incorporated or connected to the integrated trusted computing device 400.

The use of camera integrated or connected to the integrated trusted computing device 400, will allow such functions as: face recognition, OCR (Optical Character Recognition) conversion of written or typed text in image to digital text, image or video conversion. Function implemented in the integrated trusted computing device 400 or in a secured site to which the raw data is transmitted.

The integrated trusted computing device 400 may include switches and/or LEDs (or similar means) allowing for secure user interface—response to messages on the legacy display or the LEDs notifications.

Smart phone interface that provide communication and/or power, such as but not limited to, USB standard connection will allow the use of the integrated trusted computing device 400 with a smartphone. In case a gadget is designed for the smartphone, it might need to get power from a battery incorporated in the integrated trusted computing device 400 gadget.

Wireless trusted devices will require their power by means of a battery (rechargeable or disposable).

Programming a Trusted Device

The integrated trusted computing device 400 security will be maintained by:

Fixed functionality

Values could be changed to store sensitive data—particularly user data, such as but not limited to: passwords, ID numbers, credit cards . . . and others, such as but not limited to, encryption codes . . . .

The program will be structured with a shell that will be provided with the device from a contract manufacture and the specific functionality will be added in a secured physical environment.

An over the network programing feature, replacing components or adding components to the programs within the shell, will be possible only from a secured site (the only sites that the device may be communicating with) with procedures that will be complex since if such need arises it will be rare.

The integrated trusted computing device 400 may appear as a keyboard to the legacy system even though no keyboard is attached to the integrated trusted computing device 400. The legacy system will not have access to the device directly. The user will be able to communicate from the legacy system to the trusted device via a secured site, sending character strings to be processed by the integrated trusted computing device 400.

Malware in the legacy system will not have awareness of the device by observing the connection.

The integrated trusted computing device 400 will be able to send character strings and additional information to the internet or the legacy system.

The following is a list of possible functions supported by the hands-off access management and credential protection device, the integrated trusted computing device 400, but not limited to those functions:

1. The device will include a microphone or it will be attached to it communicating via a peripheral driver
2. Voice recognition
3. Voice interpretation—results the meaning of voice as text
4. Voice biometric—user recognition
5. Text to voice
6. RFID—proximity detection and interpretation
7. Password identification
8. Password communication to remote secured site
9. Communicate character strings to the legacy system.
10. Communicate modified character strings such as seeding "password"
11. Communication with site:
    1. Display character strings from secured site by transferring them to the legacy system
    2. Send character strings to the secured site to be displayed by the legacy system browser means
12. The trusted device ID number and session ID will provide another factor
13. Additional means may be connected to the device: keyboard, camera, display, speaker, other biometric . . . .

The integrated trusted computing device 400 may be programmed, if the risk of infection is extremely low and acceptable, from the secured site or another site configured for this purpose. The programing will be carried out by controlling the device by voice means or keyboard or others, interfacing the trusted device directly.

FIG. 6 depicts an integration of the integrated trusted computing device 400 (termed trusted component in FIG. 6) with a legacy system via a Bluetooth and the internet via a Wi-Fi router.

The trusted component 510 (an exemplary implementation but not limited to of the integrated trusted computing device 400) is presented to the legacy system as a keyboard, which will allow for safe operation without malware infecting the legacy system detecting its existence.

FIG. 6 depicts a fully wireless implementation of the trusted component 510 that communicates over Bluetooth 530 to a legacy system 520, which may also termed legacy computing system 130. The trusted component 510 communicates with the network (here the Internet 590) with Wi-Fi 550 to a Wi-Fi router 560.

A secured site 570 communicates with the trusted component 510 and the legacy system 520 via the internet 590

A service site 580 communicates over the internet 590 to the secured site 570

The secured site 570 supports the functionality that allow secure access from the combined computing system of The trusted component 510 and the legacy system 520

The secured site 580 supports such as but not limited to the following functions:
Receiving some or all the data of the trusted component 510, and in particular sensitive information such as but not limited to: passwords, credit cards, Id numbers such as social security, URLs, text messages, encrypted information, all key strokes, biometric data, images, video, voice, audio
Sending data to the trusted component 510—encryption codes, text messages, voice or video
Communicating with the legacy system 520 as a typical legacy edge device by means of a browser employed by the legacy system 520
Managing a single session with the user by the combined operation of the integrated operation of the trusted component 510 and the legacy system 520.
Serve as a proxy to a serviced site 580 operating securely with the combined operation of trusted component 510 and the legacy system 520.
Processing the information received from the serviced site 580 to take such actions but not limited to, display information (or other means of communication) on the legacy system 520 and receive responses from the trusted component 510

A detailed discussion of the secured site 570 will be farther detailed in the description details for FIG. 8

FIG. 7 depicts the integrated trusted computing device 400, termed here trusted component 610, supporting security functions by interfacing with a smartphone 620 that includes a Wi-Fi hotspot, which will allow the trusted component 610 communication to the internet 690 by means of Wi-Fi communication 640 to the smartphone 620 hotspot which allows access to the cellular network 660 with the LTE 650 communication of the smartphone and from the cellular network 660 to the internet 690.

Though specific wireless communication means are mentioned in the discussion they should be viewed as examples—the cellular communication LTE 650 is one of many cellular systems and the same holds for the Bluetooth 640 and the Wi-Fi 630.

The trusted component 610 communicates with the smartphone 620 via the Bluetooth 630 to provide user input to programs running on the smartphone 620. The trusted component 610 may appear to the smartphone 620 as keyboard or other input means.

As explained before, various contactless/wireless means could be implemented in the trusted component 610 to allow a user communication with the smartphone 620 as example and not limited to—voice to text/key-strokes conversion in the trusted component 610 communicated to programs in the smartphone 620 via the Bluetooth 630 link.

The secured site 670 is accessed by the internet 690 connection—by trusted component 610 by means of the Wi-Fi hotspot in the smartphone 620 while the legacy smartphone 620 communicates with the secured site 670 by the legacy means of LTE 650. Both utilize the cellular network 660 to access the internet 690 and to nodes on the internet 690.

The interface to the internet 690 is accomplished by means of the smartphone 620 that access to the cellular network 660 via the communication LTE 650.

A serviced site 680 may communicate with the secured site 670 that allow for supporting secure operation for the user by means of the trusted component 610 and the smartphone 620—accessing the serviced site 680 via the secured site 670.

FIG. 8 focuses on the integration of the secured site 700 with the trusted component 710 (termed also integrated trusted computing device 400) and the legacy system 720, the legacy system 720 to be any of but not limited to—PC, notebook, smartphone, tablet, server, watch, eye glasses. The trusted component 710 may be a any of but not limited to form factors such as USB stick or credit card.

Though reference in FIG. 8 is made to the internet 730 as the connecting network, the secured site 700 represents implementations that could be with any type of network and even a peer to peer implementation. The description of the functionality may be extended to any implementation in which a user need to communicate securely with another entity—authentication and other functions as will be apparent from the following discussion.

The key to the innovation is that the legacy system 720 is provided with security functions by means of adding the trusted component 710. The combination of trusted component 710 and legacy system 720 operate as a single computing system for a user.

The legacy system 720 is not limited in accessing the internet or other communications and legacy operation is made where the added trusted component 710 is not limiting the legacy system 720 in any way.

The secured site 700 represents is comprised of programs running on a computer (or distributed between several of them—servers or cloud services).

Secured session 701 supports the communication of the secured site 700 with the trusted component 710, providing out of band communication not accessed by the legacy system 720. The communication is presented by the line 751 which is done directly over the internet. In some cases, as presented for FIG. 7, this communication can take a complex form—trusted component 710 communicates over Wi-Fi to a hotspot of a smartphone, which utilizes the communication of the smartphone to the cellular network and from there to the internet 730.

The communication over the line 751 between the secured session 701 and the trusted component 710 may be any of but not limited to—passwords and seeded passwords, credit cards, URLs, encryption/decryption codes, any key stroke, videos/images, voice/audio, bio metric, encrypted files, account numbers, ID numbers such as social security The secured session 701 will support any of but not limited to of the following functionality: communicating with the trusted component 710 and the sessions manager 704, storing and retrieval of data from memory, evaluation of data received from session manager against stored information, authentication of the user by means of password (what user knows) or token/ID of the trusted component 710 (what user has) or bio (user features—voice recognition, facial recognition, finger print, IRIS . . . ), Legacy session 702 supports typical internet 730 session (or appropriate program if not an internet interface is implemented), communicating with legacy system 720 over the typical internet 730 connection 752.

Sessions manager 704 is a program that orchestrates the operation of the system as a whole.

The communication the sessions manager 704 with internet 730 nodes is made by the service session 703 that may support security functions as detailed later Functionality of the sessions manager 704 may be any of but not limited to—detection of malware infecting the legacy system 720, trigger an action such as warning of hacking attempt, diverting hacker/malware to seeded data and files, support access to files and data as privileged when the secured site 700 provides services, support voice/video communications sessions, the site may support a plurality of cloud applications—word processing, email, presentation, spread sheet, and others.

Specific functionality of sessions manager 704 when supporting a serviced site 740 by means of the service session 703 may include but not limited to—serving as proxy between the service site 740 and the combined computing system comprised of the trusted component 710 and the legacy system 720, deconstructing the session with the serviced site 740 into two sessions—a secured session 701 with the trusted component 710 and a legacy session 702 with the legacy system 720, combining a secured session 701 with the trusted component 710 and a legacy session 702 with the legacy system 720 into a service session 703 communicating with the serviced site 740.

The service session 703 allow the general communication of the secured site 700 with internet 730 nodes and entities.

The service session 703 allow the support of security functions for the serviced site 740. Such functions are any of but not limited to—authentication, secured access, content validation The communication between the secured site and the various elements is represented by 751, 752, and 753.

The secured site 700 may communicate with any type of secured computing system—from a distributed as this innovation suggested or integrated, where the trusted environment is encompassed in a PCIe card added to a PC or even integration on the IC (silicon) level with the processing unit (CPU—single or multicore)

At least two types of systems communicate with the secure site 700—a legacy system which is assumed untrusted and a trusted environment/hardware which communicate each via a separate physical IP. This in no way limits the number of IPs, physical or virtual that may be used in a single session simultaneously for a single user when benefits may derive such as separating certain applications by different trust levels—an application from Microsoft has trust level higher than a small game provider but less than a fully supported trusted environment—to allow providers of computing system supporting more efficient and high performance systems.

Communication of out of band—communication of the secured site 700 may be via two (or more) separate communication means, for example a notebook may be used as legacy system 720 with communication to the internet by means of a Wi-Fi while the trusted component 710 connected to it via a USB connection communicates with the internet by means of a smartphone hotspot. This allow for further security in case communication is interfered or corrupted.

Burden of security is on the secured site 700 rather than the user—the protection of the user is seamless—meaning that the user does not need to take during operation any specific action. Currently two factor authentication requires the user of taking action—example is the use of codes received on smartphone and keyed by the user to validate password and access attempt by him. With the suggested innovation there is no need for the user to take action—the password and the sue of a dedicated secure band provides the security automatically with multiple authentication as explained in the next paragraph Id number set for trusted component 710—each trusted component 701 will have a unique ID to identify it (the token function). This ID may be instilled during the manufacturing of the component or by the user during the initialization process—the use of the device for the first time or as an ID for a specific pairing with a specific legacy system 720—or by the secured site 700 during the first initialization. A session ID may be instilled by the secured site 700 at the end of every secured session to be used as another authentication factor at the next secured session.

It is important to realize that the secured site 700 with its programs could be hosted by a secured computing system where the communication to the trusted component 710 (trusted environment) and legacy component 720 (legacy environment) is made by the trusted environment of the secured computing system to support sensitive operations. Such implementation will allow support of secured applications of cloud, such as but not limited to—word processing, presentation, spread sheet, email, encryption/decryption, and others. The content will be handled as sensitive data and securely.

The following detailed example of how the protection of a password is accomplished will help in understanding how the system works and implementation of such solutions for credential protection.

Password Protection Example:

The user of the combined computing system, trusted component 710 and legacy system 720 operates them seamlessly—the only thing that is required from him is to understand that to secure access to the internet 730 he needs to use the trusted component 710 as input device.

The trusted component 710 will be a credit card form factor with Bluetooth and Wi-Fi connections The legacy system 720 will be a smartphone with an hotspot Initialization:
1. The user communicates with the secured site 700 securely by sending sensitive information directly to the secured site 700 by means of the trusted component 710. The legacy system 720 is utilized for presenting and display to the user requests of the secured site 700. The legacy system 720 operates normally and for the user there are no specific requirements. The only requirement from the user is to communicate to the legacy system 720 by means of the trusted component 710.
2. The legacy system 720 is connected to the secured site 700 by means of its browser
3. The Trusted component 710 connects to the secured site 700 by means of a program that emulates browser functions—set manually for the Bluetooth standard connection and by means of the legacy system 720 displaying information from the trusted component 710, to support the connection of the trusted component 710 to a Wi-Fi hotspot and from there transparently to the internet. The secured site 700 URL is input to the trusted component 710 by means of voice to text conversion. Other possible input devices could be a keyboard or any other a designer of trusted component 710 could envision.
4. Opening an account and setting a password with the secured site 700 is done by display on the legacy system 720 and responses sent directly (not via the legacy system 720) from the trusted component 710 to the secured site 700.
5. Trusted component 710 stores the password for blocking it from accessing the legacy system 720
6. Secured site 700 receives and stores hashed versions of the password
7. Trusted component 710 sends seeded information—fake password, which is also transferred to the secured site 700, is sent to the legacy system 720 to avoid retaliation if the legacy system 720 is infected with malware—obscuring the secured nature of the trusted component 710 communicating with the legacy system 720.
8. Trusted component 710 sends seeded information to the secured site 700 which is stored by it for future hacking attempts detection.

Login:
1. User access URL of secured site 700
2. Secured site 700 responses with a page displayed on the legacy system 720 asking user to input account number and password.
3. User, by means of the trusted component 710, inputs the account number and password.
4. The trusted component 710 transfers the account and password information directly to the secured site 700.
5. Seeded account and password are transferred by the trusted component 710 to the legacy system 720. The secured site 700 stores those values as means to identify malware action or hacking attempts.
6. The trusted component ID and session ID are sent by the trusted component to the secured site 700—not accessed by the legacy system 720.
7. The secured site 700 authenticates the user and systems by hashes of the data as required.
8. The next session ID is generated by the secured site 700 and sent to the trusted component 710.

Operation:
1. All inputs of user to the trusted component 710 are transferred to the secured site 700.
2. The secured site 700 compares the information received from the trusted component 710 to information received from the legacy system 720. Discrepancies between the trusted component 710 data and the legacy system 720 will indicate the presence of suspicious action—malware threatening the user.
3. The secured site 700 may take additional action against hacking attempts.
4. The secured site 700 may run additional applications servicing the user The secured site 700 could support security functions for a serviced site 740. The secured site 700 will serve as a proxy site that will use a service session 703 to separate the duplex (bi directional communication) communication with the service site 740 into two duplex sessions—secured session 701 with the trusted component 710 and legacy session 702 with the legacy system 720.

Example of a secured operation with a service site 740—the login page received by the secured site 700 from the serviced site 740 by means of service session 703, is sent and displayed on the legacy system 720 by means of the legacy session 702. The user recognizes the request to key account number and password. By means of the trusted component 710 the user sends the information securely to the secured site 700 by means of the secured session 701. The secured site 700 by means of the service session 703, sends the account number and password (integrated properly into the page) to the serviced site 740.

Worth noting that multifactor operation in here (which could incorporate if desire biometric authentication of the user by means incorporated in the trusted component 710, such as but not limited to—finger print, facial recognition, voice recognition, Iris . . . ) is very different from the typical use of an action required by user such as keying a code received in another channel or a specific token device for the sole process of authentication. This authentication that is carried out once or intermittently during the session still allow malware action. By use of continuous monitoring of the user input by means of the trusted component 710 with reference to the legacy system 720 communication the session continuously is protected and its integrity is maintained even in the presence extremely sophisticated malware.

In the following a specific implementation of the trusted component 710 as a credit card format is presented. It is important to understand that any person skilled in the art could apply the various features described for the trusted card form factor may apply to any type of trusted component 710 and in general to any trusted environment.

FIG. 9 depicts a preferred embodiment in which the trusted component 710 is implemented in a credit card form factor as a trusted card 900.

The card 900 interfaces the legacy system 720 by means of a Bluetooth 910 and the internet by means of a Wi-Fi 920—the Wi-Fi router does not need to be shared with the legacy system 720, as described above.

The trusted card 900 is fully portable between systems where there is an interaction of devices via Bluetooth with legacy systems 720 allowing emulation of input device such as but not limited to, as a keyboard host, implemented in the legacy system 720 and the trusted card 900 appearing as a keyboard to the legacy system 720.

The trusted card 900 may communicate in other ways to the legacy system 720, as acceptable by the legacy system 720—based on the emulation of input devices implemented and supported by the trusted card 900. In any case, the trusted card 900 will not be identifiable by malware infecting the legacy system 900. This is clearly adoptable by any implementation of a trusted component 710 of which the trusted card 900 is an example.

The trusted card 700 will support various functions, such as:
1. Sensitive user information protection by automatic evaluation and detection of information content, sent from/to legacy system 720 or peripheral connected to the trusted computing device, the trusted card 900 or the secured site 700, and block it from reaching the legacy system 720—passwords, encryption codes, credit cards numbers, white/black listing (firewall) . . . —while allowing it access secured site(s) on the internet.
2. Replacing the sensitive information, if desired, by "seeded" information for detection of malware or hacker actions/

3. Support session protection by avoiding access by malware infecting the legacy system 720
4. Avoid content modification by malware
5. Operate stealthy, avoiding its existence and exposure to malware—preventing retaliation
6. Voice to text conversion
7. Voice recognition and authentication
8. Support Blockchain technology—safe exchanges via the trusted card 900 as an electronic wallet
9. Support electronic wallet in general and safe payments
10. Authentication: Password, biometric: voice, token: device ID, session ID
11. Encrypted communication of any media sent to the secured site 700 directly from peripherals connected to the trusted card 900 or even document received from legacy system 720.
12. Encryption of information (or any media) sent from the trusted card 900 or secured site 700 via the legacy system 720 to other nodes of the network/internet.

The setting of the trusted card 900 will not require any special training. It will require well established user actions and operations to connect the trusted card 900 to the legacy system 720 and the internet by the means described above for the trusted component 710.

The trusted card 900 will be supported by the secured site 700 that will allow the use of its secure operations to access safely sites on the internet and detect, masquerade, contaminate hackers systems.

Some components of the trusted card 900 depicted in FIG. 9 are, but not limited to:
1. Computing elements: CPU, memory, bus, peripherals and interfaces to peripherals.
2. Wi-Fi interface 920
3. Bluetooth interface 910
4. Microphone and speaker
5. Display 930
6. Light power source 90
7. LEDs
8. Push keys/keyboard/touchscreen
9. Interface socket(s): Charging, wired communication with legacy systems, connecting peripherals to the device A secured site 700 will support communication with the user by means of display on legacy system 720 (smartphone to desktop any other) by means, but not limited to, of text, audio/voice, images/video, graphics or any other.

Information could be fed to the legacy system 720 from the secured site 700 via the trusted card 900.

Information could be fed to the secured site 700 from the legacy system 720 via the trusted card 900.

The legacy system 720 may communicate directly with the secured site 700 and display of information from the secured site 720 by means of the legacy system 720 may be altered by various means, such as human test and CAPCHA, to mask and protect content (text, voice, image, video . . . ) from malware infecting the legacy systems 720 and support validation of content authenticity—defeating attempts by malware infecting the legacy system 720 to modify sites, commands or files content, by the malware or hacker controlling the malware.

FIG. 10 depicts the configuration that provides insight into the innovation and designs suggested with this patent, a user 1600 communicating safely by means of secured computing system 1000 with a secured site 1500.

The secured computing system 1000 comprising:

A first computing system 1100, the first computing system 1100 including any of a personal computer, a notebook, a tablet, a smartphone, a watch, a ring, a dedicated computing system or combination thereof.

The first computing system 1100 communicating with a second computing system 1200, the second computing system 1200 including any of a personal computer, a notebook, a tablet, a smartphone, a server, a watch, a ring or combination thereof.

The first computing system 1100 communicating by means of 1530 with a network 1300.

The first computing system 1100 communicates by means of 1510 with a user 1600 that uses secured input and output means, to receive user input data or deliver user output data, where the communication not accessible by the second computing system 1200.

The first computing system 1100 configured to support security functions including any of authentication, storing sensitive information, detecting character strings, seeding, encryption, decryption, sending data to the second computing system 1200 by means of 1520, or combination thereof.

The first computing system 1100 communicates information with a secured site 1500 by means of 1530 to network (Internet/cloud 1300) and means of 1550 from network 1300 to the secured site 1500, sending data to the secured site 1500 or receiving data from the secured Site 1500.

The first computing system 1100, communicates by means 1520, 1530, 1510, wirelessly or wired with any of second computing system 1200, network 1300, user 1600 or combination thereof.

The first computing system 1100, executes encryption and decryption functions.

A network node 1700 which includes a secured site 1500 running on a server 1700.

The server 1700 comprising any of processors executing programs, memory storing data and programs or combination thereof.

The first computing system 1100 validates content by displaying it to the user 1600 by means of the second computing system 1200.

The secured site 1500 includes a program communicating with a secured computing system 1000, the secured computing system 1000 comprised of a first computing system 1100 and a second computing system 1200.

The program running by the secured site 1200 supports a single user 1600 session and simultaneously communicates with the first computing system 1100 and the second computing system 1200.

The secured site 1500 communication with the first computing system 1100 not accessible by the second computing system 1200.

The secured site 1500 communicating with the second computing system 1200.

The secured site 1500 communicates user 1600 sensitive information with the first computing system 1100, sending data to the first computing system 1100 or receiving data from the first computing system 1100.

The secured site 1500, communicates with a serviced site 1400 to support functions any of user 1600 authentication, session integrity, content validation, hacking attempt or combination thereof.

The secured site 1500, enable security functions, any of user 1400 authentication, session integrity, content validation, hacking attempt or combination thereof.

The secured site 1500, executes encryption and decryption functions.

A method for securing user 1600 information communicated between a secured computing system 1000 and a secured site 1500, comprising of:

The secured computing system 1000 communicating with the secured site 1500.

The secured computing system 1000 comprised of a first computing system 1100 and a second computing system 1200.

The first computing system 1100 including any of a personal computer, a notebook, a tablet, a smartphone, a watch, a ring, a dedicated computing system or combination thereof.

The second computing system 1200 including any of a personal computer, a notebook, a tablet, a smartphone, a watch, a ring, a dedicated computing system or combination thereof.

The first computing system 1100 communicates with the second computing system 1200.

The first computing system 1100 communicates with the secured site 1500 and the communication not accessible by the second computing system 1200.

The first computing system 1100 receives user 1600 input data or delivers user 1600 output data, communicating a user 1600 sensitive information with the secured site 1500, not accessible by the second computing system 1200.

The secured site 1500, supports security functions, any of authentication, session integrity, content validation, detect hacking attempt, or any combination.

The secured site 1500, could communicates with a serviced site 1400 serving to secure communication with the secured computing system 1000.

The secured site 1500 and the first computing system 1100, may execute encryption and decryption functions.

Information may be displayed to the user 1600 by means of the second computing system 1200.

All means of communication 1510, 1520, 1530, 1540, 1550, and 1560 may be wired, such as USB, or wireless, such as Bluetooth or WiFi.

An example of a preferred embodiment—

An example of a preferred embodiment will be use of a smartphone as first computing system 1100 and a notebook could serve as the second computing system 1200.

The user 1600 use these two systems combined as secured computing system 1000 to communicate to the internet sites.

The smartphone serves as the secured device for the user 1600 to input data to the smartphone that also serves as the first computing system 1100 that communicates to the notebook that serves as the second computing system 1200.

The smartphone, the first computing system 1100, will emulate a Bluetooth keyboard.

In this specific example such emulation will allow an implementation in which the second computing system 1200 will be oblivious to the use of a securing element, the second computing system 1100, encompasses by the use of the smartphone emulating the keyboard to be used by user 1600.

User 1600 key strokes by the means of the keyboard emulator are communicated directly to the secured site 1500 by means of the cellular network (1300) while processed versions are communicated via Bluetooth to the notebook (second computing system 1200).

The secured site 1500 may also communicate with notebook, displaying information to the user 1600 on which he may act.

Sensitive information keyed by the user 1600 may be blocked from getting to the notebook or modified to elude malware that could infect the notebook.

Access to a third party site, service site 1400, (collaborating or not collaborating) may be secured by having the communication of the secured computing system 1000 to the third party site, service site 1400, by means of the secured site 1500 that serves as a proxy.

As described in the specification, such system structure could support various security functions defeating malware infecting the notebook and secure the user 1600 operation.

Worth noting that any person skilled in the art may envision and implement designs that are variations of the given example with various combinations of off the shelf computing systems—Personal computers, notebooks, tablets, or smartphones.

More than two computing systems may be combined to achieve higher level of security.

Numerous security functions may be implemented, of which some are presented above, by programing proper functionality into programs running by the first computing system 1100, secured site 1500, and second computing system 1200.

A person skilled in the art could develop solutions based on the suggested architecture in this and pother patents to respond to various securing requirements. Nothing in the given examples hereafter limit in any way the possible embodiments supported by the system based on two computing system combined as a single secured computing system 1000.

Examples of enhancing security by adding functionality:
1. To enhance the security of the secured computing system 1000, alternating use of keyboard between first computing system 1100 and second computing system 1200, allows detecting malware presence in any of the systems with aid of communication via the secured site 1500.
2. The keyboard organization may be modified from session to session to defeat malware infecting the system from obtaining user keystrokes and access sensitive information as passwords, credit cards numbers, account numbers . . . etc.
3. The securing program of the keyboard emulator and Bluetooth and internet connections may be loaded to the smartphone (the first computing system 1100) before a session carried out directly from the secured site 1500 or the second computing system 1200 to avoid malware/hacker from studying the application. At the end of the session the application is removed
4. Next session Id may be implemented to defeat malware/hacker from participating in a secured session.
5. The user 1600 may be presented on the display of the second computing system 1200 with information from the secure site 1500 by means of CAPCHA or other to hide messages from the malware/hacker
6. Communication of malware to the hacker may be avoided by disabling other applications from accessing the internet such as browsers.
7. By having the secured site 1500 displaying a page with fields to present information to the user 1600 with regard to the user 1600 data communication with the secured computing system 1000—user 1600 keystrokes "of a sensitive character string" transferred to the second computing system 1200, information pertaining to the "of a sensitive character string" received by secured site 1500 from the first computing system 1100 and from the second computing system 1200. This three character strings related to the same message allow the detection of malware infecting either the first computing system 1100 or the second computing system 1200.
8. In the smartphone, first computing system 1100, install a simple proprietary browser, allowing for safe communication with the secured site 1500 and get the serviced site 1400 communication without the use of the second computing system.

9. The second computing system 1100, the smartphone in an exemplary embodiment, is programmed to be viewed by the second computing system 1200, as a memory device when communicated to upload data from the second computing system 1200 to the first computing system 1100.

Review of previous patents will reveal numerous embodiments clear to any person skilled in the art and how they may be modified and enhanced to improve user 1600 security.

Further to previous patents, additional possible embodiments that are based on the basic innovation could be well accepted and understood by persons skilled in the art where off the shelf computing systems are utilized by a user simultaneously, to secure communication to a network by supporting single session on two communication channels to a network or peer to peer, communicating with service computing system, termed in the figures as Stand Alone Site.

The communication between users computing systems and another remote computing system as mentioned above and further details here after may be wired or wireless, network or peer to peer. Further emphasized about any potential communication means as exemplary for the wireless communication—internet, cellular, WiFi, Bluetooth etc. . . . .

The service computing system, Stand Alone Site in the figures, may be structured also from multiple computing systems, with flexible communication to the user.

The user may utilize multiple computing systems to support a single session, communicating to the service computing system, Stand Alone Site in the figures.

In the following the discussion focuses on use of two computing systems by the user and several embodiment, in some a single computing system (Stand Alone Site in the figures—SAS) serves the service or in others two computing systems are making the service computing system (SAS)

As emphasized above, a person skilled in the art could design the user system with multiple computing systems to achieve desired security functionality by assigning security functions (such as—authentication, encryption, updates of programs, . . . ) to different systems.

Same may be implemented with the service computing system, the SAS.

Typically a user will use one system as legacy computing system allowing full communication and functionality while engaging session with the SAS while security functions will be serving the user with means of a trusted computing system.

FIG. 11 depicts the basic structure of the Stand Alone Site network/system. Many of the aspects described in details in previous descriptions and details apply also to the discussion and descriptions here after and any person skilled in the art will apply them to fit his specific design.

This is a basic embodiment that may be utilized in various ways by persons skilled in the art. Some of such possible variations are further explored to allow a person skilled in the art being able to tailor designs to specific requirements and applications.

Legacy computing system 1102 is an off the shelf computing system (Such as: PC, notebook, tablet, smartphone . . . ) that is used for all general communications with a network/peer which does not require secure handling.

The Trusted computing system 1101 could be an off the shelf computing system (Such as: PC, notebook, tablet, smartphone . . . ). It could be communicating to the Legacy computing system 1102 (via Bluetooth, WiFi, USB . . . ).

The Stand Alone Site (SAS) 1103 is communicating with the Legacy computing system 1102 and the Trusted computing system 1101 and allows for secure access to network/Peer 1104 nodes and other computing systems. In some embodiments the SAS 1103 may be integrated with an edge-device/node of the network. In other embodiments the SAS 1103 may be a device that serves as proxy to secure user communications to other computing systems.

The innovation suggested here is focusing on the Stand Alone Site (SAS) 1103 as a program running and executed by a computer. This computer could be a secured computing system structure—including legacy computing systems and trusted computing systems. The program may run on a standalone computing system with the sole purpose to serve as proxy for the user to access securely network/peers. The program may be run as a component of a complex software application—such as: a program in router, part of an Internet site, component in an IoT, component of an autonomous system—car or home automation . . . . It is up to a person skilled in the art to take advantage of specific implementations.

Various security functions may be supported by the SAS 1103 program. In the following discussion is of such functions that will not require any modifications of the off the shelf systems. In some cases specific potential modifications will be presented to enhance security of the user communication and protection of sensitive information:

Pairing—the session will start with matching a legacy computing system 1102 with a trusted computing system 1101. This could be achieved in many ways as someone skilled in the art find fit. For example a character string may be sent to trusted computing system 1101 by the SAS 1103 and then sent back to the SAS 1103 by the legacy computing system 1102. The SAS 1103 compares and matches the character string received from the legacy computing system 1102 with the one sent to the trusted computing system 1101—thus pairing.

Manage user's accounts—Open account by setting an Identification string and password. Allocating resources such as memory storage. Allocating functions such as encryption/decryption. Allowing for memory storage modification.

Authentication—Validation user by means of password evaluation.

Session integrity maintenance—use character strings received from the Trusted computing system 1101 to carry operation.

Content validation—comparing user input against actual content

Proxy—access to network/peer 1104 and split it into two sessions, one with the Trusted computing system 1101 and the other with the Legacy computing system 1102

Encryption and management of encrypted files—supporting encryption and hashing operations and manage encrypted files, defeating ransomware attacks by supporting safe recovery Maintaining network sessions with the Legacy computing system 1102 and the Trusted computing system 1101—communicating with user inputs and presenting to user information to allow secure, private, and safe operation.

Communication via texting of cellular communication—supporting communication by texting means over the cellular system taking advantage of communications of mobile systems Allow for seeding—storing seeded information, such as the seeded password that is communicating during the authentication phase to the Legacy computing system 1102 by the Trusted computing system 1101, and later evaluate it against authentication attempts to detect hacking or malware attempts to access the Stand Alone Site 1103.

Detect malware or hacking attempts by means of seeding—Detecting the malware or hacking attempts allow for actions for further seeding by directing access to non-sensitive information. Support locating of source of hacking attempt while the channel of proxies is still active, in real time.

The Trusted computing system 1101 could be used as is or a software program may be loaded to support functions to communicate to the Legacy computing system 1102 or to the Stand Alone Site (SAS) 1103.

Example of such program, but not limited to, could be an emulation of keyboard connected to the legacy computing system 1102 by means of USB or Bluetooth, allowing for operation where the legacy computing system 1102 is oblivious that a user use the secure means supported by the combination of the trusted computing system 1101 and a SAS 1103.

Many details were provided in previous descriptions that will not be repeated here.

It is emphasized that programs may be incorporated in the legacy computing system 1102, the trusted computing system 1101, and the SAS 1103 to secure edge or cloud applications such as—word processor, presentation (Power Point), Excel, email . . . .

Securing such application will be achieved by separation of FORM, processed by the legacy computing system 1102, and CONTENT to be processed by the trusted computing system 1101. Integration of FORM with CONTENT may be exercised by the SAS 1103 or the trusted computing system 1101.

Encryption will be required only for the CONTENT, greatly improving on the quality and management of encrypted information.

Further clarification to the Stand Alone Site 1103—the device may be a home device that communicates to the home WiFi Network/Peer 1104 which allow the SAS 1103 device communication to internet sites—serving as a proxy to communication of the Legacy computing system 1102 and the Trusted computing system 1101 with the internet site.

Any person skilled in the art will have the knowledge how to apply features as described above to the ASA 1103 device.

FIG. 12 depicts a structure with direct communication to an IoT (Internet of Things) device 1203 that includes a SAS program. A user communicates with IoT device 1203 over the network (could be internet) or directly (could be over the cellular system) by means of a secured computing system comprised of two computing systems, Legacy computing system 1202 and Trusted computing system 1201.

Feature described above for the SAS may apply to the SAS program integrated in the IoT device 1203.

Key functions supported by the SAS incorporated in the IoT 1203 are: Pairing, User authentication, User data (such as: commands or inquiries) validation, Masked response to the Legacy computing system 1202, detection of malware by comparing communication received from the Legacy computing system 1202 to communication received from Trusted computing system 1201, storing of authentication and seeded information—all of which functions described in details in previous paragraphs to the benefit of a person skilled in the art, thus not repeated here.

FIG. 13 depicts a SAS, incorporate in the Remote Trusted computing device 1303 that serves as proxy for a secure computing system comprised of the Legacy computing system 1302 with the Trusted computing system 1301 to access securely other security computing systems and nodes of a network such as the internet.

Example of such are corporate servers that require user authentication and sessions validation to defeat malware infecting the administrator. The Remote Trusted computing system 1303 is connected to corporate servers and support the secure access of the administrator to the server(s) with authentication functions—pairing, identify users, maintain session integrity, detect tampering and hacking attempts—as detailed in previous paragraphs.

FIG. 14 depicts communication to an edge device 1405 (Could be an IoT) by means of a Remote Trusted computing system 1403 and a site/Cloud Server 1404.

In this embodiment the SAS is integrated into the Remote Trusted computing system 1403.

The user is communicating with both Remote Trusted computing system 1403 and Site/Cloud Server 1404 by means of a Trusted computing system 1401 and a Legacy computing system 1402.

The Remote Trusted computing device 1403 supports security functions as detailed in previous paragraphs, of which are: Pairing, authentication, session integrity, malware detection . . . .

The communication of the user to the Edge device 1405 by means of the Trusted computing system 1401 via the Remote Trusted computing system 1403 is secure and will allow greatly enhancing security, privacy and safety of the implementation.

The Site/Cloud Server 1404 may be designed to support functions to allow communication as desired, as example to allow communication with the user by both Trusted computing system 1401 and Legacy computing system 1402 the pairing function—identifying both system as participating in same user session—being supported by the Site/Cloud Server.

User and/or Edge device 1405 Communication with the Site/Cloud Server 1404 supports functions that by design require updates or upgrades of its programs and as result pose potential risk of infection with malware of the Site/Cloud Server 1404. Adding a Remote Trusted computing system 1403 allow bypassing the vulnerable Site/Cloud Server 1404 which even if infected will not access sensitive communication to the Edge device 1405.

Example: Authentication of a user to the Edge device 1405 will be exercised via the Trusted computing system 1401 and the Remote Trusted computing device 1403.

The Trusted computing system 1401 and the Remote Trusted computing device 1403 have restricted functionality and could be designed with relatively low power.

The Edge device 1405 includes a SAS program that allow the secure communication with the Remote Trusted computing device 1403 and Site/Cloud Server 1404.

Functions supported by the SAS program in the Edge device 1405 could be of the functions as mentioned in previous paragraphs and more, as a person skilled in the art might find fit! Key functions will be:

Pairing—identifying the Remote Trusted computing device 1403 and Site/Cloud Server 1404 as a single entity to perform tasks and manage a session.

Authentication—of sources of information and persons

Secure communication of Encryption/Decryption codes

Detect malware presence or hacking attempts by identifying seeded data

As clearly stated above—there is no limitation of the secure functionality that may be added by persons skilled in the art.

It should be emphasized that the Edge device 1405 may include a Trusted computing element to protect sensitive information generated in the Edge device 1405 and requires protection, particularly if the Edge device 1405 programs are updated and may be infected with malware.

Such means may be adopted from other patents and documents describing details of securing such edge devices as sensors and actuators incorporated in ICS/SCADA systems.

FIG. 15 depicts an example of a detailed application for securing home automation and in particular a home security system. This solution may be adopted in various ways and modified to support needs and requirements in numerous applications. This is just an exemplary implementation and any person skilled in the art could adopt it to implement systems where security is a requirement.

In FIG. 15 a system is described utilizing off the shelf computing systems with added trusted devices and software to implement a secured home security system based on a camera that is accessed securely from a remote Legacy computing system, a Smartphone Hotspot 1502. The use of Smartphone Hotspot 1502 is made to emphasize that this is a typical smartphone with a hot-spot capability. The hot-spot is typically WiFi wireless communication.

A Trusted Computing system 1501, with a form factor similar to a typical credit card, allow secure access to remote SAS when using the Smartphone Hotspot 1502. The form factor could be any as a specific application or a person skilled in the art prefers—a dongle attached to the Smartphone Hotspot 1502 as example.

The Trusted Computing system 1501 communicates with the Smartphone Hotspot 1502 via Bluetooth wireless communication. The communication may be implemented by means of a USB connection or any other as fit the application or preferred by a person skilled in the art.

Trusted Computing system 1501 may masquerade as input device—Keyboard, memory card, microphone or any other input device Trusted Computing system 1501 may masquerade as output device—Memory card, speaker or any other output device.

Both systems are connected to the cellular network—

The Smartphone Hotspot 1502 by its conventional means and the Trusted Computing system 1501 by means of the hot-spot function of a typical smartphone, the Smartphone Hotspot 1502. The use of the hot-spot of the Smartphone Hotspot 1502 system by the Trusted Computing system 1501 will allow secure communication by it to the cellular network, without awareness and access to the communication by the Smartphone Hotspot 1502.

The Hot Spot of the Smartphone Hotspot 1502 connects directly to the cellular system by means of the Smartphone Hotspot 1502.

The communication of Smartphone Hotspot 1502 to the cellular network is made by means Cellular Tower 1503.

A home Cellular Modem 1504 may be connected to another Cellular Tower 1503 to receive the communication from the Smartphone Hotspot 1502 and the Trusted Computing system 1501.

Accessing securely the Edge Device (camera) 1507 is made by means of the Remote Trusted computing device 1506 while other communication and control may be supported by the Home security Hub 1505.

A SAS is implemented in the Edge Device 1507 supporting such functions as pairing, authentication, malware detection etc. as desired by the person skilled in the art of designing such systems and partially specified in previous paragraphs.

Other implementations are possible and an example is described in the following.

The communication from Cellular Tower 1503 to the home devices may be implemented by means of the internet where the home WiFi network is connected to the internet, is supporting the connection to home devices. This is another example of another possible communication that will be appreciated by a person skilled in the art, demonstrating the flexibility of using the secured design!

FIG. 16 depicts an application of the innovation utilizing off the shelf computing devices. Those computing devices may be customized and configuration may include secured elements as described in other applications of the innovation, in this and other patent specifications. Any person skilled in the art could apply the innovation as he finds fit.

Example of a possible such secure and ease of use means could be a Bluetooth Keyboard Emulation app installed in the Smartphone 1602 that will allow user sending keystrokes (character strings) directly to the Notebook 1601. The Smartphone 1602 will be masquerading as a Bluetooth keyboard to the Notebook 1603.

Another example: An Emulation of a Bluetooth Memory or USB Memory app will be installed in the Smartphone 1602 and serve for communication to the Notebook 1601, where the Smartphone 1602 masquerades as a memory device to the Notebook 1601.

The reason for presenting this application is to focus the discussion on the single program that makes all the difference—the Stand Alone Site (SAS) 1604 program that secures user communication to the internet, WWW 1606, by the configuration of three off the shelf unsecured computing systems—Notebook 1601 that represents a legacy computing system that may be infected with malware, the Smartphone 1602 that represents a trusted computing system, and both connect to a Legacy Computer 1603 that runs the Stand Alone Site (SAS) 1604.

Both Notebook 1601 and Smartphone 1602 are connected to the Legacy Computer 1603 by means of a WiFi device typically incorporated these days in every Legacy Computer 1603.

The communication by means of WiFi is just an example—communication of the different computing elements may be made by other wireless means (such as Bluetooth) or wired (such as a conventional physical wired LAN). It is expected that a typical home will use the WIFi wireless communication.

Since this configuration could be implemented in corporate, public, or home environment it may be implemented by a variety of communication channels to the internet, WWW 1606, as it is evident from previous discussions in this document and other document and any person skilled in the art will know how to implement such.

In this example the connection to the internet, WWW 1606, is made through a typical home communication WiFi Modem 1605.

By the user communicating with a combined computer system of Notebook 1601 as a legacy computing system and the Smartphone 1602 as a secured computing system, the user establishes a secure communication to the WWW (World Wide Web) 1606

Since here is basically a repeat of description for the SAS 1604, in the following details are provided of the functionality supported by the SAS 1604 program. Person skilled in the art will appreciate that example provided for use of the functions are just exemplary to further detail use of the innovation.

In the following reference is made to functions of SAS 1604 program, and will be referenced as "the program":

- Pairing: The program identify communication from Notebook 1601 and Smartphone 1602 and pairs them based on a protocol which could include a character string sent by the program, by means the Legacy Computer 1603, to one of the system the user uses, let assume the Smartphone 1602 which will display it to the user. The user will key the same character string in the Notebook 1601 that transmits it back to the program, by means of the Legacy Computer 1603. The program identifies that the character string sent to the Smartphone 1602 is identical to the one received from the Notebook 1601 and pairs them to support secure communication by the user.
- Set and Login to Legacy Computer 1603: By means of the combined computer systems of Notebook 1601 and Smartphone 1602 the user may set securely an account and password with the SAS 1604. Than the user may securely access his account at the SAS 1604 by means of the password even if the Notebook 1601 is infected with malware.
- Store sensitive information: Sensitive information will be sent directly from the Smartphone 1602 to the SAS 1603 user's account, not accessible by the infected Notebook 1601.
- Communicate with a WWW 1606 site selected by the user
- Parsing: The user may access sites of the WWW 1606 by means of the SAS 1604 program. The site pages received by the SAS 1604, hosted in the Legacy Computer 1603, may be parsed to support two sessions simultaneously interacting with the user by means of the Notebook 1601 and the Smartphone 1602. The session with the Smartphone 1602 will be secured, avoiding access by the Notebook 1601 to the communication.
- Communication to Notebook 1601: User communication with the Notebook 1601 is made by the usual input/output means, such as keyboard or display.
- Communication to Smartphone 1602: User communication with the Smartphone 1602 is made by the usual input/output means, such as keyboard or display.
- Seeding: Since the malware infecting the Notebook 1601 is not aware of the Smartphone 1602 use as secured computing system, information masquerading as sensitive information may be fed by the user to the Notebook 1601, such as a forged password, that if later used by the malware or hacker to access the SAS 1604, the hacking attempt will be detected in real time. Hacker may be relatively easy located while all proxies in place.
- Malware detection: By comparing information communicated from the Notebook 1601 to information communicated from the Smartphone 1602 malware may be detected if it alters the user input to the Notebook 1601. Example—changing account number. Such detection of the source may have value in catching hackers red handed.
- Hacking attempt: Detection of hacking attempts allow for further feeding hacker with information and delaying action to retaliate smartly against such attempts.

FIG. 17 depicts the architecture where elements are integrated into a single Secured Modem 1710—a WiFi modem in which the SAS 1704 is integrated. Also integrated into it are the home WiFi Modem 1705, the Legacy Computer 1703, and the WiFi device 1707 connected to the Notebook 1701 and Smartphone 1702, to communicate with sites or nodes of the World Wide Web (WWW) 1706.

All the discussion for FIG. 16 applies to this diagram since basically all components are presented in both and any person skilled in the art will know how to apply the FIG. 16 discussion to FIG. 17—thus repetition is not needed for clarification.

It is further emphasized that the three computing systems as described in above paragraphs and the related figures, may be integrated into a single hardware unit, representing for the user a SINGLE system acting from the perspective of the user as a SECURED "LEGACY" computing system with some additional specific user operating instructions to secure user sensitive information and actions.

In the following the Stand Alone Site (SAS) will be called program. The server/computing-system executing this program is the First Computing System.

Even though any person skilled in the art knows what is a computing system worth noting that the various computing systems referred to in the following have a processing device, memory that stores programs and data, communication means to other computing systems, or input and output means for users to interact with the computing systems.

Clarification is also made with regard to malware infection—software downloaded into a computing system to interfere and interrupt the operation of the computing system.

Innovation Summary

A program and method to secure user communication (Such as Stand Alone Site 1604 in FIGS. 16 and 1704 in FIG. 17)

The program executed by a first computing system (such as the Legacy Computer 1603 in FIGS. 16 and 1703 FIG. 17)

The program communicates with a second computing system that may be infected with malware (such as Smartphone Hotspot 1502 in FIG. 15 and Notebook 1601 in FIG. 1601)

The program communicates with a third computing system which is not infected with malware (such as Trusted Computing System 1501 in FIG. 15 and Smartphone in FIG. 16)

The second and third computing systems are serving a user accessing the program executed by the first computing system The program supports a secure communication with the third computing system, where the second computing system is prevented from access to the secure communication The program allows the user to communicate sensitive information to the first computing system by means of the third computing system, where the second computing is prevented from accessing or eavesdropping on the user sensitive information Specific Functions:

Pairing (the program executed by the first computing system identifies the user communication to the first computing system by means of two computing systems—second and third computing systems).

Authentication (Securing the user identification means, such as: Password, token, biometric, with the out-of-band communication of the third computing system with the program executed by the first computing program).

Session integrity (the user secure communication from the third computing system is the source of sensitive information)

Content validation (secure content sent by the user to the program executed by the first computing system made by presenting the information to the user as communication from the first computing system to the second computing system by means of the third computing system)

Securing display of second computing (information from the program executed by the first computing system may be communicated and presented by means of the second computing system utilizing techniques, such as CAPTCHA, to avoid deciphering of the information by malware infecting the second computing system)

Seeding (The third computing system or the user feed the second computing system with marked information, such as a seeded modified password, to avoid copying it by the malware and leading potential malware to "believe" that this is the genuine information. This seeded information is stored by the first computing system—could be used to verify continuous pairing and detect malware attempt to interfere with the user session.)

Encryption/decryption (The program in the first computing system carries this function. The third computing system carry-out encryption and decryption functions for documents that may be transferred to it by the first or second computing systems. Encrypted information may be stored by the third computing system in either first or second computing systems. Encrypted information may be retrieved by means of the third computing system for decryption from either first or second computing systems. Decrypted information by the third computing system may be presented to the user by means of the second computing system communicated directly by the third computing system communicating it to the second computing system or via the first computing system.)

Malware detection (Information received from the second computing system at the first computing system is compared by the program to expected information. Discrepancies indicate tampering with the information—high probability of malware presence in the second computing system)

Hacking attempt detection (The program in the first computing system monitors for communications that contain seeded information—example: attempt to login with a seeded password—such communication indicates attempts by malware or hacker to cause some type of damage and discovery of such will allow for taking preventive actions)

Parsing (The program executed by the first computing system will communicate with network nodes and computers receiving information—example: a site page from a bank for funds transfer. The program extract information to support communication with the second computing system—example: display the remote internet site page on the second computing system. The program communicates with the third computing system—example: receives information as user response to account information foe funds transfer to be inserted in the page displayed to the user on the second computing system, and the filled page is that sent to the network nodes and computers)

The third computing system masquerading to avoid malware awareness of secured system to avoid interfering and interruption of operation of the second computing system (example: the third computing system will run a keyboard emulation and appear as "keyboard" to the second computing system. The third computing system will emulate a flash memory device and appear to the second computing system as "flash memory"—USB or Memory card)

The program executed in the first computing system where the first computing system configured as any of standalone computing system, integrated in WiFi modem, with the second and third computing systems, server connected over a network or combination there off.

The first, second, or third computing system could be any off PC, tablet, smartphone, watch, server, computing device or combination there off.

What is claimed is:

1. A network computing system comprising:
   a program that is stored in a memory, and enables a secured site;
   a processor that executes the program;
   a first computing system that executes processes and communicates information with the program; and
   a second computing system that executes processes and securely communicates information with the program, wherein the second computing system is free of malware;
   the first computing system is restricted from accessing the information that was securely communicated by the second computing system with the program;
   the first computing system is unaware of the processes executed by the second computing system and the second computing system is unaware of the processes executed by the first computing system;
   the program pairs the first computing system with the second computing system; and
   a user communicates information with the program through the first computing system and the second computing system that were paired,
      wherein the first computing system and the second computing system concurrently communicate information with the program, and first computing system and the second computing operate simultaneously;
      the first computing system manages a first portion of a unified session, and the second computing system manages a second portion of the unified session, and the program integrates the first portion of the unified session with the second portion of the unified session;
      the first computing system manages the user's non-sensitive information; and
      the second computing system manages the user's sensitive information and the first computing system is restricted from accessing or intercepting the user's sensitive information.

2. The network computing system of claim 1, wherein the program executes an authentication function.

3. The network computing system of claim 1, wherein the program supports a session integrity function, by evaluating information received from the first computing system to information received from the second computing system.

4. The network computing system of claim 1, wherein the program supports a content validation function, by allowing the user to evaluate information sent by the first computing system against information stored by the program.

5. The network computing system of claim 1, wherein the program implements a secure display, by altering and presenting information to the user through the second computing system to prevent malware from recovering the altered information.

6. The network computing system of claim 1, wherein the program supports a seeding function, by modifying sensitive information and sending the modified sensitive information to the first computing system, to detect whether malware is infecting the first computing system.

7. The network computing system of claim 1, wherein the program supports encryption functions and decryption functions that protect the user's sensitive information.

8. The network computing system of claim 1, wherein the program executes a malware detection function, by evaluating information received from the second computing system against the user's sensitive information sent by the first computing system.

9. The network computing system of claim 1, wherein the program executes a hacking attempt detection function, by evaluating seeded information stored by the program against information received from a hacker.

10. The network computing system of claim 1, wherein the program executes a parsing function.

11. The network computing system of claim 1, wherein the first computing system communicates information with the second computing system; and
    the first computing system is unaware of the configuration of the second computing system, and the second computing system is masquerading as a user input device.

12. The network computing system of claim 1, wherein the program serves as a proxy.

\* \* \* \* \*